United States Patent
Kumagai et al.

(10) Patent No.: US 8,558,787 B2
(45) Date of Patent: Oct. 15, 2013

(54) INPUT DEVICE AND METHOD, INFORMATION PROCESSING DEVICE AND METHOD, INFORMATION PROCESSING SYSTEM, AND PROGRAM

(75) Inventors: Hideaki Kumagai, Kanagawa (JP); Hiroyuki Ogawa, Chiba (JP); Hideo Niikura, Tokyo (JP); Kazuyuki Yamamoto, Kanagawa (JP); Hidetoshi Kabasawa, Saitama (JP); Toshio Mamiya, Tokyo (JP)

(73) Assignee: Sony Corporation, Tokyo (JP)

( * ) Notice: Subject to any disclaimer, the term of this patent is extended or adjusted under 35 U.S.C. 154(b) by 368 days.

(21) Appl. No.: 12/709,937

(22) Filed: Feb. 22, 2010

(65) Prior Publication Data
US 2010/0245238 A1 Sep. 30, 2010

(30) Foreign Application Priority Data

Mar. 30, 2009 (JP) ................. 2009-081569

(51) Int. Cl.
G09G 5/00 (2006.01)
(52) U.S. Cl.
USPC ........... 345/156; 345/157; 345/158; 345/159; 345/161; 345/163; 345/164; 345/165; 345/166; 345/167; 345/169; 345/173; 345/179; 345/7; 345/8; 345/17; 345/46; 715/245; 715/700; 715/740; 715/800; 715/810; 715/863; 715/864; 715/784

(58) Field of Classification Search
USPC ......... 345/156–159, 161, 169, 173, 179, 7–8, 345/17, 46, 163–167; 715/863, 700, 810, 715/864, 740, 800, 784, 245
See application file for complete search history.

(56) References Cited

U.S. PATENT DOCUMENTS

| 7,233,316 | B2 | 6/2007 | Smith et al. | |
| 7,782,298 | B2 * | 8/2010 | Smith et al. | 345/157 |
| 2005/0216867 | A1 * | 9/2005 | Marvit et al. | 715/863 |
| 2006/0164384 | A1 | 7/2006 | Smith et al. | |
| 2006/0164385 | A1 | 7/2006 | Smith et al. | |
| 2006/0164386 | A1 | 7/2006 | Smith et al. | |
| 2006/0178212 | A1 * | 8/2006 | Penzias | 463/37 |

FOREIGN PATENT DOCUMENTS

| JP | 2001-251693 | 9/2001 |
| JP | 2006-526844 | 11/2006 |

\* cited by examiner

*Primary Examiner* — Alexander S Beck
*Assistant Examiner* — Amen Bogale
(74) *Attorney, Agent, or Firm* — Oblon, Spivak, McClelland, Maier & Neustadt, L.L.P.

(57) ABSTRACT

An input device includes an operating unit that a user grasps and operates in a three-dimensional free space in order to remotely operate an information processing device; and a transmitting unit to transmit a signal for a first gesture in the free space of the operating unit to set a mode, and a signal for a second gesture in the free space of the operating unit which differs from the first gesture to execute processing in the mode set based on the first gesture.

19 Claims, 37 Drawing Sheets

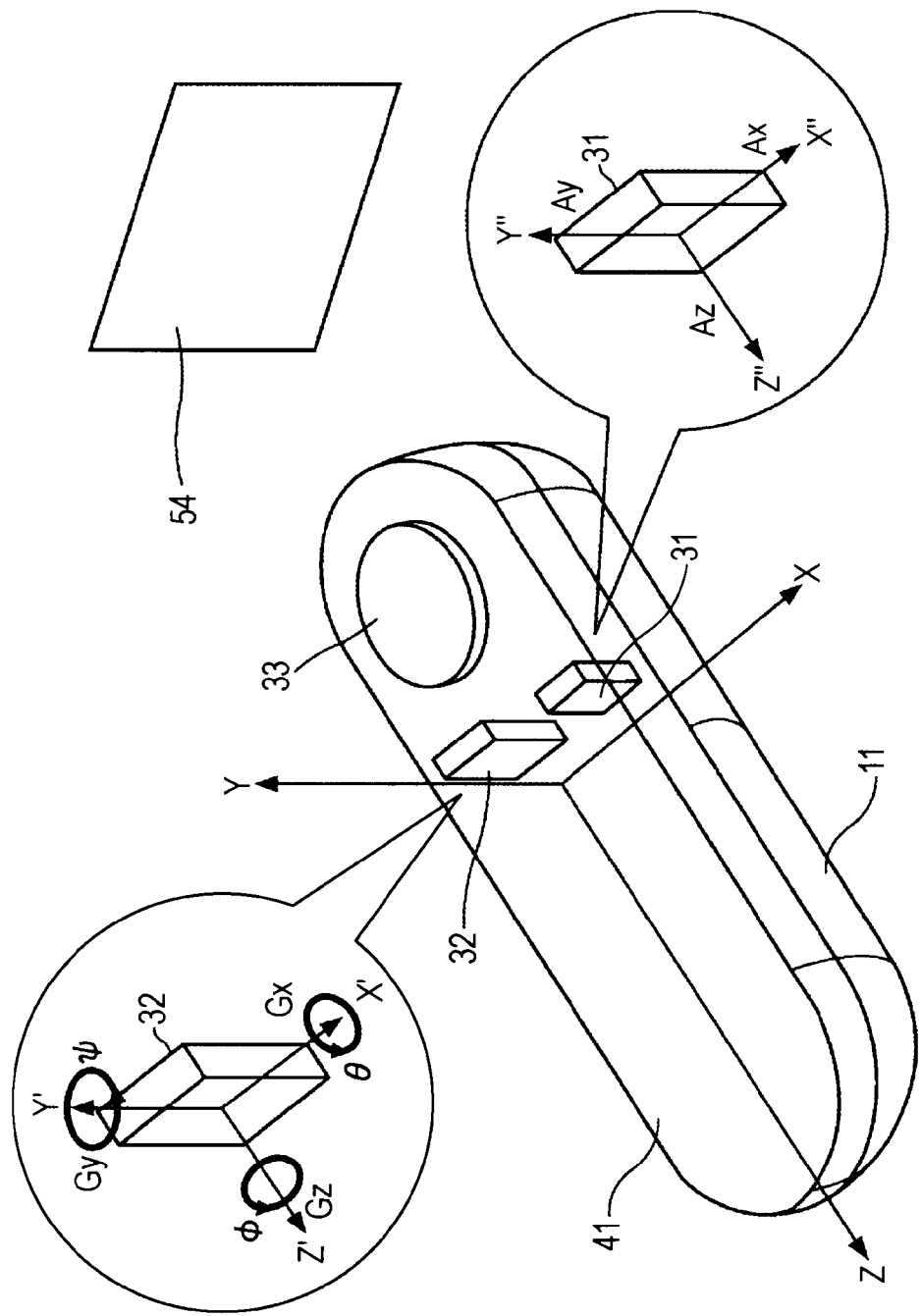

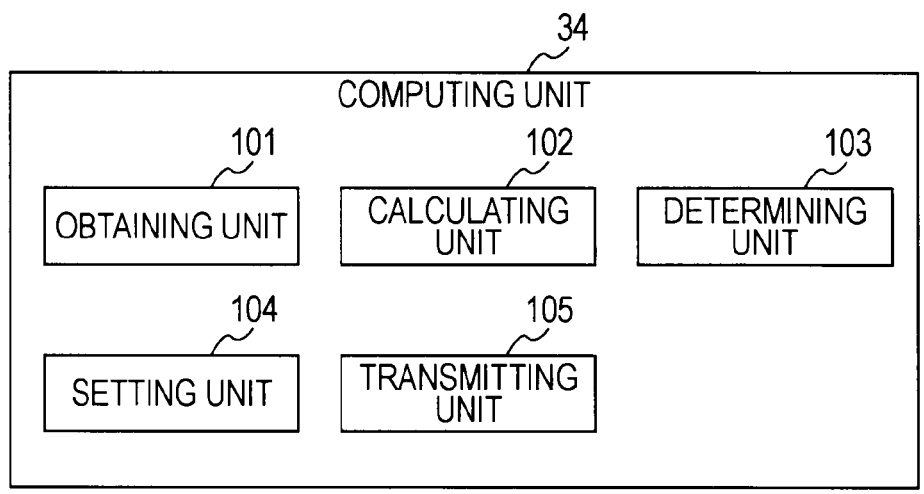
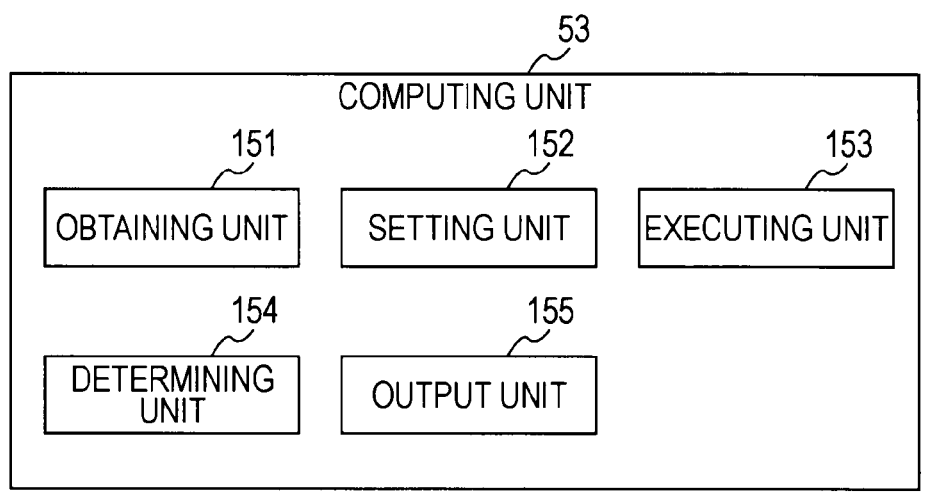

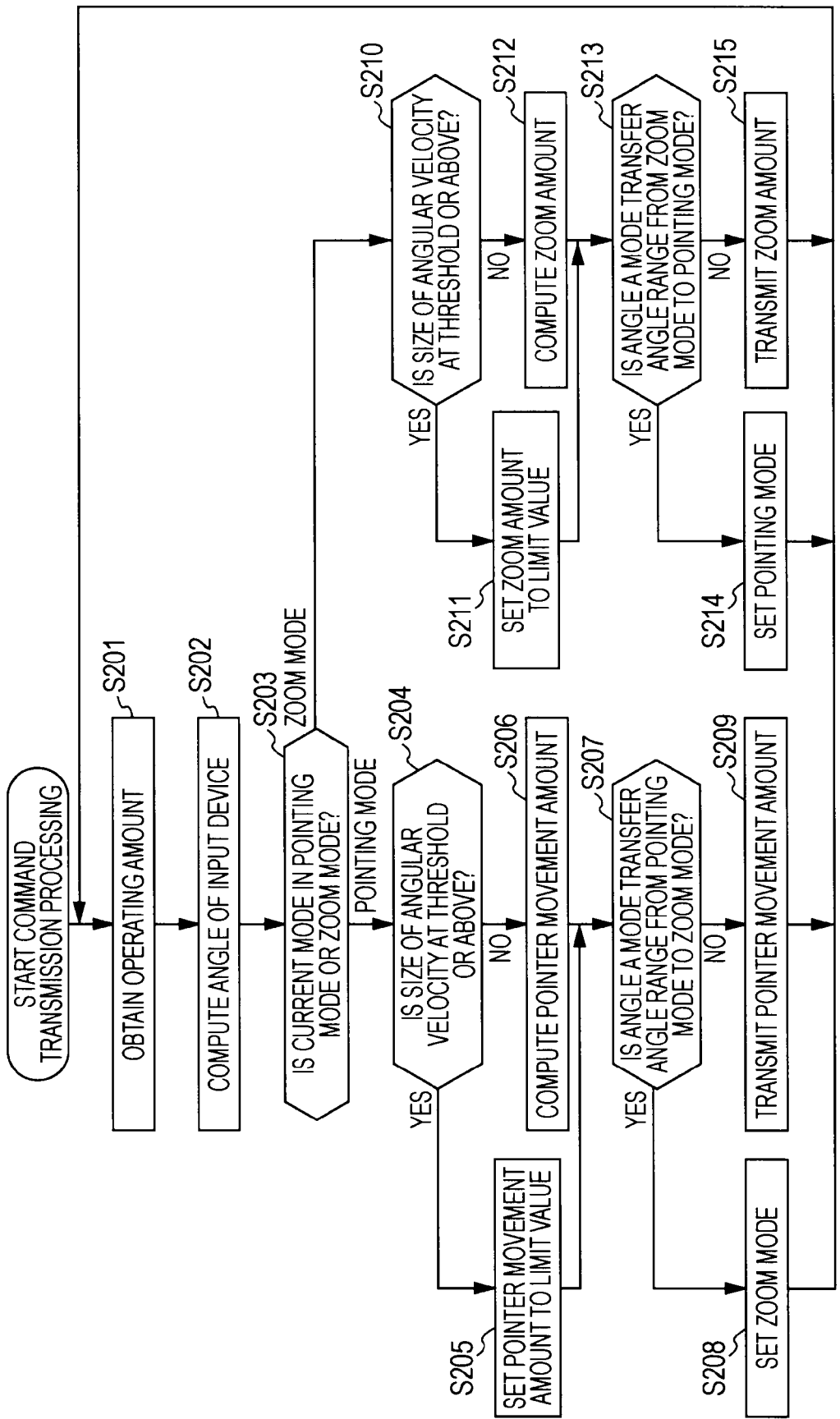

INPUT DEVICE AND METHOD, INFORMATION PROCESSING DEVICE AND METHOD, INFORMATION PROCESSING SYSTEM, AND PROGRAM

BACKGROUND OF THE INVENTION

1. Field of the Invention

The present invention relates to an input device and method, information processing device and method, information processing system, and program, and in particular relates to an input device and method, information processing device and method, information processing system, and program enabling fewer parts and lower costs.

2. Description of the Related Art

Recently, various types of equipment have been remote controlled with an input device such as a remote controller. However, as equipment functions have become more complex, the numbers of buttons, keys, and levers of input devices have increased and operability thereof has become poorer. Thus, an input device that is operated in optional directions within a three-dimensional free space has been proposed (e.g. Japanese Unexamined Patent Application Publication No. 2006-526844).

An acceleration sensor or gyro sensor is built into such an input device, whereby the state thereof is detected. Predetermined operations that are performed as to the input device, i.e. gestures, correspond to predetermined functions, and a user commands the corresponding function by inputting a predetermined gesture with the input device. Thus, the number of buttons, keys, levers and so forth can be reduced as compared to an input device operated with buttons, keys, levers and so forth.

Also, rotating the input device, switching the mode change amount according to the rotation amount thereof or the command group, and selecting the change amount or command group for each mode with a button has also been proposed (e.g. Japanese Unexamined Patent Application Publication No. 2001-251693).

SUMMARY OF THE INVENTION

However, with either proposal, a gesture and button operation are used together. Accordingly, with these input devices, not only is the number of parts not reduced, the cost becomes high.

It has been found desirable to reduce the number of parts, and reduce the cost.

According to an embodiment of the present invention, an input device has an operating unit that a user grasps and operates in a three-dimensional free space in order to remotely operate an information processing device; and a transmitting unit to transmit a signal for a first gesture in the free space of the operating unit to set a mode, and a signal for a second gesture in the free space of the operating unit which differs from the first gesture, to execute processing in the mode set based on the first gesture.

According to an embodiment of the present invention, an information processing system includes an input device; and an information processing device that is controlled by remote control signals from the input device; wherein the input device is grasped and operated by a user in a three-dimensional free space in order to remotely operate an information processing device; the information processing device sets modes based on the first gesture in the free space of the input device; and executes processing for the modes that are set based on the first gesture, based on a second gesture in the free space of the input device which differs from the first gesture.

According to an embodiment of the present invention, an information processing device includes an obtaining unit to obtain gesture signals in the free space of the operating unit from the operating unit that is grasped by the user and operated in a three-dimensional free space in order to remotely operate the information processing device; a setting unit to set modes, based on a first gesture in the free space of the operating unit; and an executing unit to execute processing for the modes that are set based on the first gesture, based on a second gesture in the free space of the operating unit which differs from the first gesture.

According to a configuration of the present invention, the operating unit is grasped by the user and operated in a three-dimensional free space in order to remotely operate the information processing device; and the transmitting unit transmits a signal of a first gesture in the free space of the operating unit in order to set the mode, and a signal of a second gesture in the free space of the operating unit that differs from the first gesture, in order to execute processing of the mode that has been set based on the first gesture.

According to a configuration of the present invention, the input device is grasped by the user and operated in a three-dimensional free space in order to remotely operate the information processing device. The information processing device sets the mode based on the first gesture in the free space of the input device, and executes processing in the mode that has been set based on the first gesture, based on the second gesture in the free space of the input device which differs from the first gesture.

According to a configuration of the present invention, the operating unit is grasped by the user and operated in a three-dimensional free space in order to remotely operate the information processing device; the obtaining unit obtains the signal for the gesture in the free space of the operating unit; the setting unit sets the mode based on the first gesture in the free space of the operating unit; and the executing unit executes processing in the mode set based on the first gesture, based on the second gesture in the free space of the operating unit which differs from the first gesture.

Thus, the above-described configurations enable fewer parts and lower costs.

BRIEF DESCRIPTION OF THE DRAWINGS

FIG. 2 is a perspective diagram illustrating a configuration of an input device;

FIG. 3 is a block diagram illustrating a functional configuration of a computing unit of the input device;

FIG. 4 is a block diagram illustrating a functional configuration of a computing unit of an image display device;

FIG. 17 is a flowchart describing command transmission processing;

DESCRIPTION OF THE PREFERRED EMBODIMENTS

Figure 1:
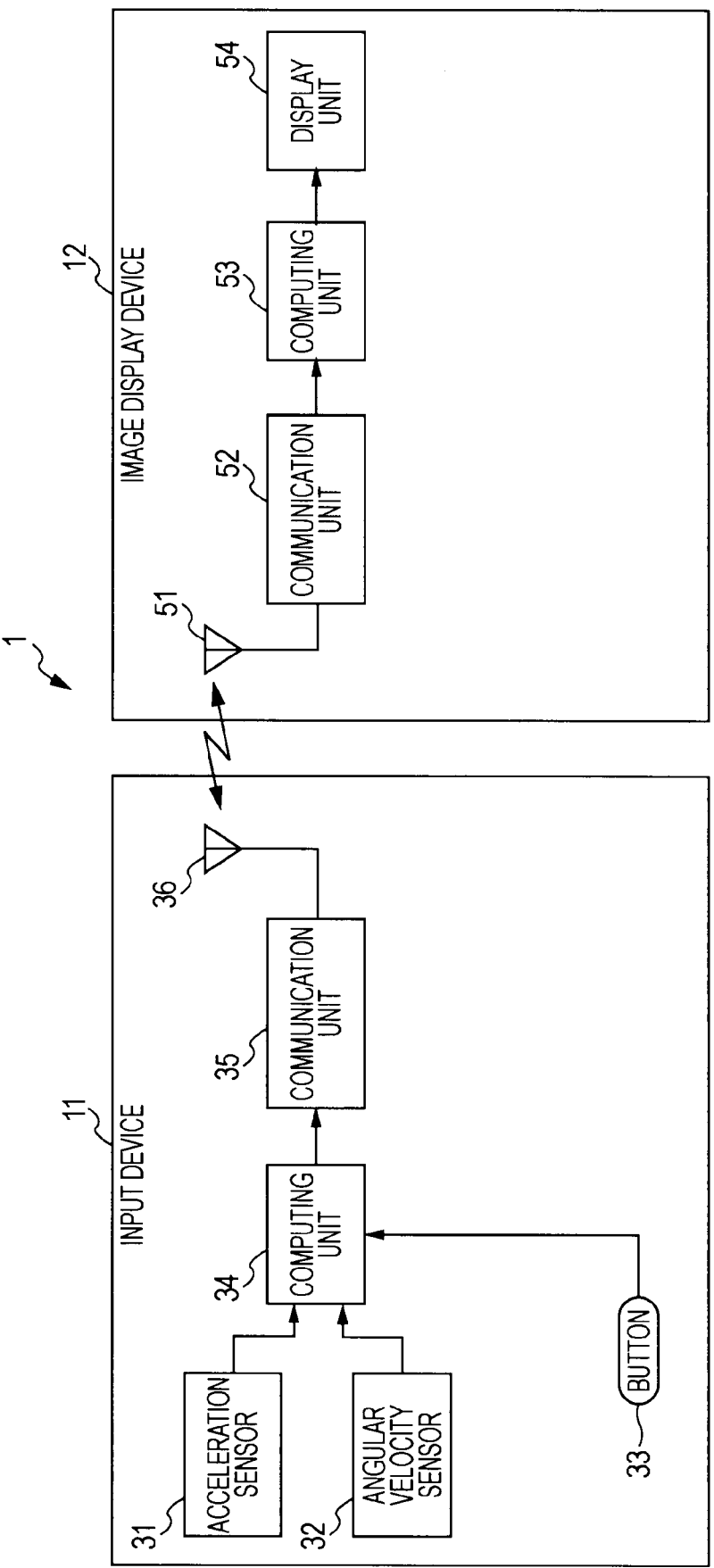
FIG. 1 is a block diagram illustrating a configuration according to an embodiment of an information processing system of the present invention.

Embodiments of the present invention will be described below. Note that description will be given in the following order.

1. First embodiment (system configuration)
2. First embodiment (configuration of input device)
3. First embodiment (functional configuration of computing unit)
4. First embodiment (command transmission processing 1)
5. First embodiment (display control processing 1)
6. Second embodiment (command transmission processing 2)
7. Second embodiment (display control processing 2)
8. Third embodiment (command transmission processing 3)
9. Fourth embodiment (command transmission processing 4)
10. Fifth embodiment (command transmission processing 5)
11. Fifth embodiment (display control processing 3)
12. Sixth embodiment (error display preventing control processing 1)
13. Sixth embodiment (error display preventing control processing 2)
14. Sixth embodiment (error display preventing control processing 3)
15. Sixth embodiment (error display preventing control processing 4)
16. Sixth embodiment (error display preventing control processing 5)
17. Seventh embodiment (display control processing 4)
18. Seventh embodiment (icon output example 1)
19. Seventh embodiment (icon output example 2)
20. Seventh embodiment (icon output example 3)
21. Seventh embodiment (icon output example 4)
22. Modified example

1. First Embodiment

System Configuration

FIG. 1 is a block diagram illustrating the configuration of an embodiment of an information processing system of the present invention. This information processing system 1 has an image display device 12 serving as an information processing device and a pointing device or an input device 11 serving as a remote controller to remotely control the image display device 12.

The input device 11 has an acceleration sensor 31, angular velocity sensor 32, button 33, computing unit 34, communication unit 35, and antenna 36. The input device 11 makes up a what can be called an "aerial remote controller" which is operated in mid-air. In the case that the input device 11 is operated in an option direction in a 3-dimensional space, the acceleration sensor 31 and angular velocity sensor 32 each detect the acceleration and angular velocity of the input device 11.

The button 33 is operated by the user. Only one button is shown in the diagram, but in reality multiple buttons are configured. For example, the button 33 is made up of a direction button that is operated by the user in the case of moving the pointer in the up/down/left/right directions, a determining button to operate when confirming a selection, a numerical keypad corresponding to numbers, and so forth.

A computing unit 34 made up of a microprocessor or the like for example detects operation results of the acceleration sensor 31, angular velocity sensor 32, and button 33. The signals of commands and the like corresponding to the detection results are amplified and modulated by the communication unit 35, and transmitted by radio waves to the image display device 12 via the antenna 36.

The image display device 12 made up of a television receiver for example has an antenna 51, communication unit 52, computing unit 53, and display unit 54.

The antenna 51 receives the radio waves from the input device 11. The communication unit 52 amplifies and demodulates the signals received via the antenna 51. The computing unit 53 made up of a microprocessor or the like for example executes predetermined operations based on the signals from the communication unit 52. The display unit 54 displays an image. Note that although not shown in the diagram, the image display device 12 has functions to receive a television broadcast and display images on the display unit 54.

Configuration of Input Device

FIG. 2 is a perspective view showing an external view of the input device. The input device 11 has a main unit 41 serving as an operating unit which is operated by the user to generate operation signals to control the image display device 12 serving as an information processing device. The diagram shows one button 33 as a representation on the upper face of the main unit 41, but in reality multiple buttons are provided thereupon.

The user grasps the input device 11, i.e. the main unit 41, points the front portion thereof towards the image display device 12, and operating in optional directions in the 3-dimensional space or operates the button 33. Thus, the pointer can be moved in the operating direction, predetermined modes can be set, and predetermined operations can be commanded.

On the front portion of the input device 11, the acceleration sensor 31 and angular velocity sensor 32 manufactured with MEMS (Micro Electro Mechanical Systems) technology are attached. X"Y"Z" are relative coordinate system axes perpendicular relative to the acceleration sensor 31. X'Y'Z' are relative coordinate system axes perpendicular relative to the angular velocity sensor 32. The X"Y"Z" axes and X'Y'Z' axes are each parallel to one another. XYZ are absolute coordinate system axes relatively perpendicular. The X axis and Z axis are axes within a horizontal plane, and the Y axis is an axis that is in an orthogonal direction perpendicular as to the horizontal plane.

In the case that the entire main unit 41 is operated in an optional direction in the 3-dimensional space by the user, with the front portion of the main unit 41 (the end portion in the upper right direction in FIG. 2) in a state of being pointed toward the display unit 54 of the image display device 12 positioned in the forward direction thereof, the angular velocity sensor 32 which is made up of a biaxial oscillating type angular velocity sensor detects the angular velocity of a pitch angle θ and yaw angle ψ which rotate with the pitch rotating axis and yaw rotational axis that are parallel to the X' axis and Y' axis respectively. Alternatively, instead of the oscillating type of angular velocity sensor, a geomagnetic type of angular sensor can be used. The acceleration sensor 31 detects the acceleration Ax(t), Ay(t) in the X" axis and Y" axis directions. The acceleration sensor 31 can detect the acceleration as a vector amount. A 3-axis type acceleration sensor having the three axes of the X" axis, Y" axis, and Z" axis serving as sensitivity axes can also be used.

The user grasps the input device 11 with the hand, and operates the entire input device 11 in optional directions within a 3-dimensional free space. That is to say, the input device 11 is a so-called aerial remote controller, and is operated in mid-air rather than being used while placed on a desk top. The input device 11 detects the operating direction thereof, and outputs the operating signal in the direction of operation. Also, the input device 11 outputs a corresponding operation signal in the event that the button 33 is operated.

Functional Configuration of Computing Unit

FIG. 3 is a block diagram showing a functional configuration of the computing unit 34 of the input device 11. The computing unit 34 has an obtaining unit 101, calculating unit 102, determining unit 103, setting unit 104, and transmitting unit 105.

The obtaining unit 101 obtains angular velocity and acceleration, as well as button information corresponding to the operated buttons. The calculating unit 102 calculates the angle, pointer movement amount, zoom amount and so forth of the input device 11. The determining unit 103 performs various types of determining processing. The setting unit 104 performs setting processing such as mode settings, flag settings, and so forth. The transmitting unit 105 transmits commands and so forth to the image display device 12.

FIG. 4 is a block diagram illustrating functional configuration of the computing unit 53 of the image display device 12. The computing unit 53 has an obtaining unit 151, setting unit 152, executing unit 153, determining unit 154, and output unit 155.

The obtaining unit 151 obtains the signals transmitted from the input device 11. The setting unit 152 sets the mode. The executing unit 153 executes commands. The determining unit 154 performs various types of determining. The output unit 155 outputs the signals.

Command Transmission Processing 1

Figure 5:
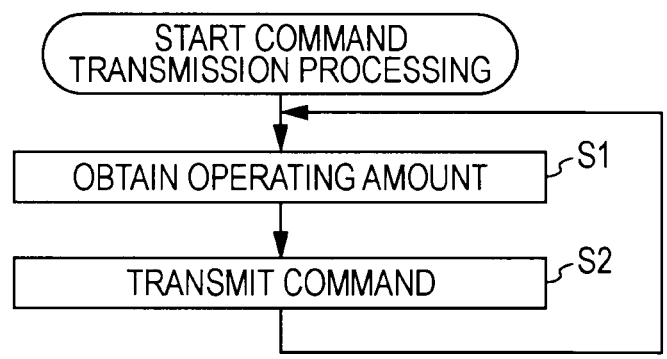
FIG. 5 is a flowchart describing command transmission processing.

FIG. 5 is a flowchart to describe the command transmission processing of the input device 11. The command transmission processing of the input device 11 will be described below with reference to FIG. 5.

In step S1, the obtaining unit 101 obtains an operating amount. Specifically, detection output of the acceleration sensor 31 and angular velocity sensor 32 and the button information based on operations of the button 33 are obtained.

That is to say, the angular velocity sensor 32 outputs the angular velocity (ωψ(t), ωθ(t)) around the Y' axis and around the X' axis of the movement generated in the case that the user grasps and operates the input device 11 in a 3-dimensional free space. Similarly, the acceleration sensor 31 outputs the acceleration (Ax(t), Ay(t)) of the X" axis and Y" axis of the movement generated in the case that the user grasps and operates the input device 11 in a 3-dimensional free space. The obtaining unit 101 obtains the detected angular velocity (ωψ(t), ωθ(t)) and acceleration (Ax(t), Ay(t)). Specifically, the angular velocity (ωψ(t) ωθ(t)) and acceleration (Ax(t), Ay(t)) are subjected to A/D conversion by an A/D converter built in to the computing unit 34, and are input.

Next in step S2 the transmitting unit 105 transmits commands based on the obtaining result in step S1. Specifically, the commands are modulated in the communication unit 35, and transmitted by radio wave to the image display device 12 via the antenna 36.

Note that a command is not necessarily a command in terms of format, but may be information by which the image display device 12 can execute predetermined processing based thereupon.

By the above processing being repeated, predetermined commands are transmitted from the input device 11 to the image display device 12.

Display Control Processing 1

Upon a command having been transmitted from the input device 11 by the processing shown in FIG. 5, the antenna 51 of the image display device 12 receives the radio waves thereof. The communication unit 52 demodulates the command that has been received via the antenna 51, and supplies this to the computing unit 53. The obtaining unit 151 of the computing unit 53 obtains the transmitted command. The computing unit 53 executes the display control processing based on the command herein.

Figure 6:
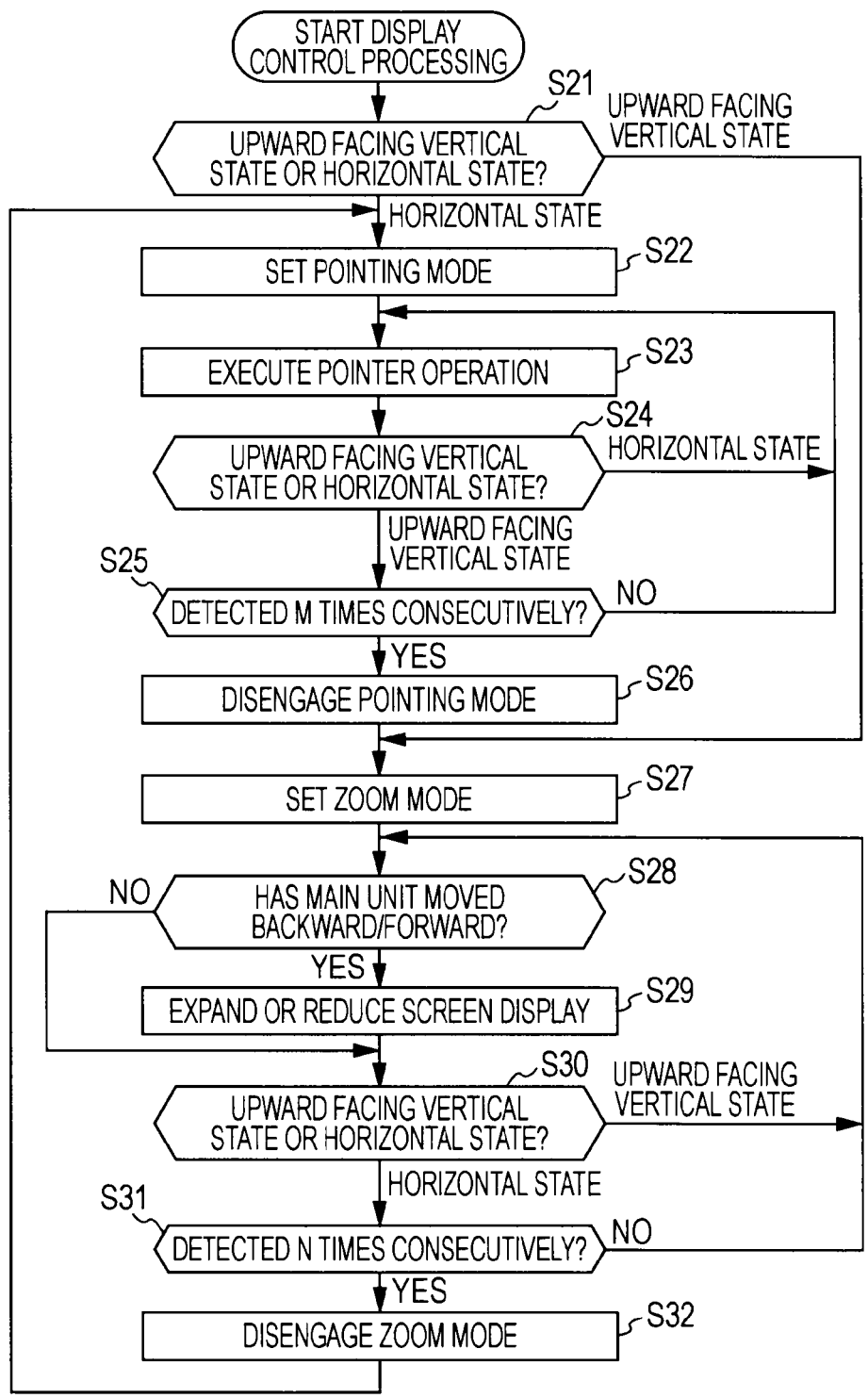
FIG. 6 is a flowchart describing display control processing.

FIG. 6 is a flowchart describing the display control processing which the image display device 12 executes. The display control processing will be described below with reference to FIG. 6.

In step S21, the determining unit 154 which of an upper-facing vertical state and a horizontal state is the state of the input device 11. The state of the input device 11 will be described with reference to FIG. 7.

Figure 7:
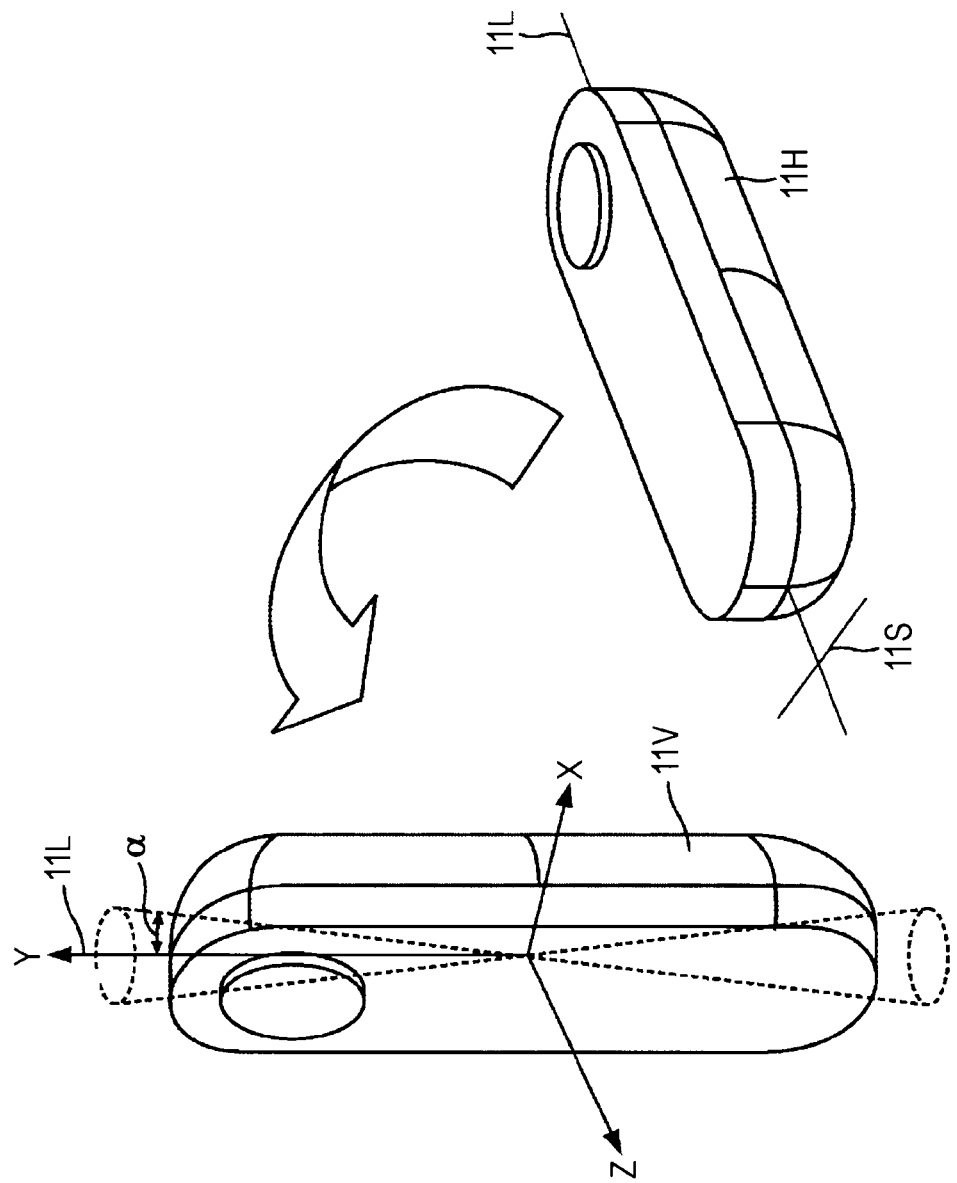
FIG. 7 is a diagram describing a first gesture.

FIG. 7 is a diagram to describe a first gesture. When the user sets the zoom mode, the first gesture is operated. The first gesture is a rotational movement gesture to rotate the input device 11 into a state that the front end thereof is in an upward facing vertical state (the state denoted by reference numeral 11V) from the horizontal state that the front face of the input device 11 faces upward (the state denoted by reference numeral 11H), with an axis 11L in the lengthwise direction of the input device 11 and a vertical axis 11S as the center thereof, as shown in FIG. 7, so that the front face of the input device 11 faces the user. That is to say, in step S21, determination is made as to whether the state of the input device 11 is in an upward facing vertical state denoted by reference numeral 11V.

The angle α as to the Y-axis of the axis 11L in the lengthwise direction of the input device 11 can be determined from the size of the acceleration Az(t) in the Z" axis direction shown in FIG. 2. When the angle α as to the Y-axis is within a first threshold (e.g. 10 degrees) that is set beforehand, the input device 11 is determined to be in an upward facing vertical state. For example, when the difference between the acceleration Az(t) and the gravitational acceleration g is within a first threshold, i.e. when the acceleration Az(t) and the gravitational acceleration g are roughly the same, the input device 11 can be determined to be in an upward facing vertical state.

Figure 8:
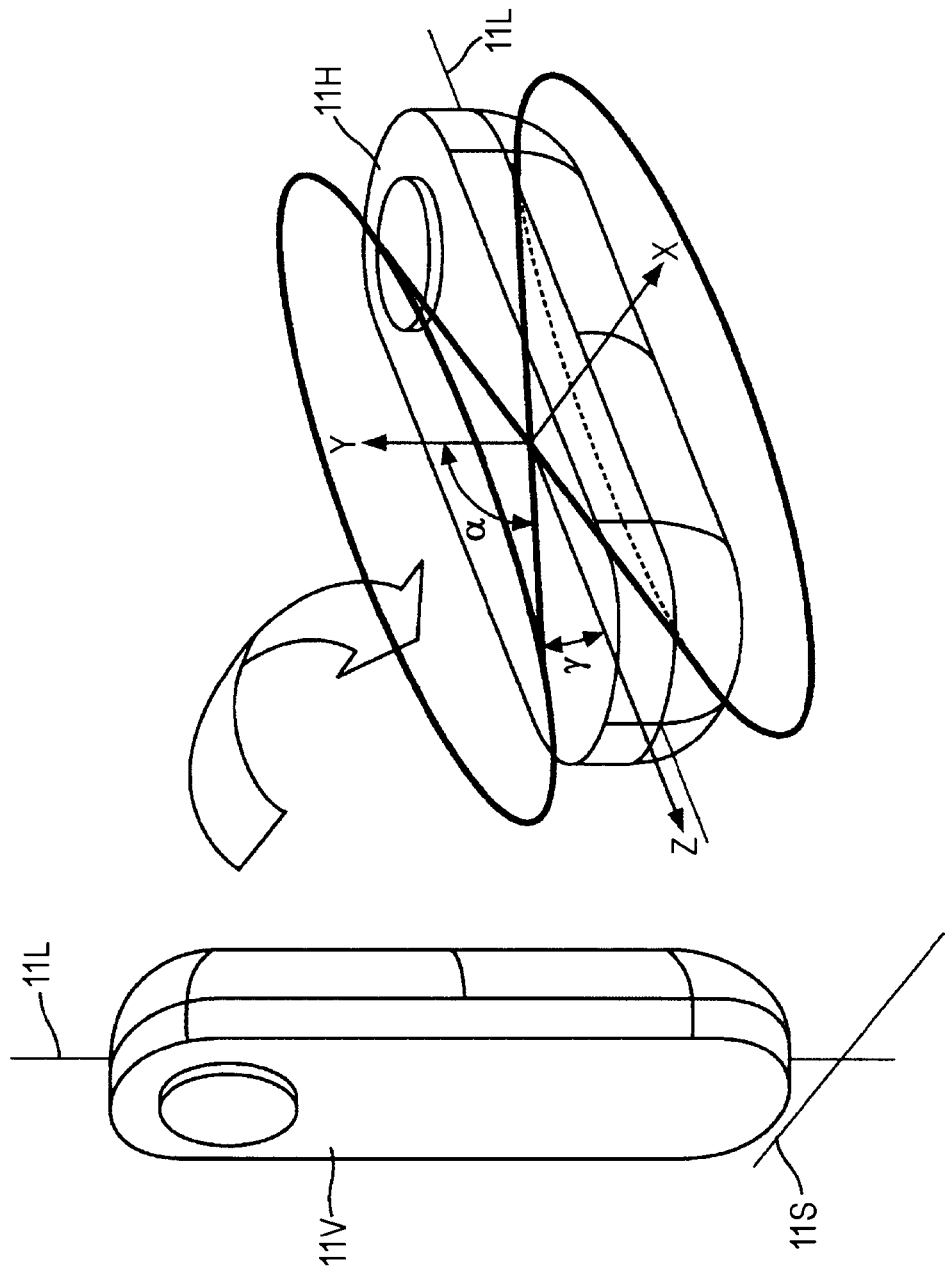
FIG. 8 is a diagram describing a third gesture.

On the other hand, in the case of setting the pointing mode, the user operates a third gesture. FIG. 8 is a diagram describing the third gesture. As shown in the diagram, the third gesture is a gesture to rotate the input device 11 to a horizontal state that the front face of the input device 11 faces upward (the state denoted by reference numeral 11H), from the state that the front end thereof is in an upward facing vertical state so that the front face faces the user (the state denoted by reference numeral 11V), with the axis 11L in the lengthwise direction of the input device 11 and the vertical axis 11S as the center thereof. That is to say, the third gesture is a rotational movement gesture that is the opposite gesture as the first gesture.

When an angle r as to the Z-axis of the axis 11L is within a preset threshold (e.g. 10 degrees), the input device 11 is determined to be in a horizontal state. In other words, when the angle α (=90−γ) between the axis 11L in the lengthwise direction of the input device 11 and the Y axis is at or above a second threshold (e.g. 80 degrees), the input device 11 is determined to be in a horizontal state.

The angle γ as to the Z-axis of the axis 11L in the lengthwise direction of the input device 11 can be determined from the size of the acceleration Az(t) in the Z" axis direction in FIG. 2. For example, in the case that the acceleration Az(t) in the Z" axis direction is nearly 0, i.e. in the case that there is virtually no component force in the Z" axis direction of the gravitational acceleration g, the input device 11 is determined to be in a horizontal state.

It goes without saying that the determination of the state can be performed using various other types of information transmitted with the processing in step S2 in FIG. 5.

In the case that the state of the input device 11 is determined to be in a horizontal state, i.e. in the case that the angle α is determined to be at or above the second threshold, the setting unit 152 in step 22 sets the pointing mode. The pointing mode is a mode to move the pointer corresponding to an operational amount of the input device 11.

In step S23 the executing unit 153 executes a pointer operation based on a command. That is to say, the user grasps the input device 11 in a roughly horizontal state facing the display unit 54, and operates at an optional speed in an optional direction in a 3-dimensional space, whereby the command based on the operational amount thereof is transmitted. The pointer displayed on the display unit 54 is moved and displayed in a predetermined position corresponding to the operational amount thereof. Alternatively, an object that is in a selected state corresponding to the operational amount thereof is modified into another object.

The determining unit 154 in step S24 determines whether the state of the input device 11 in pointing mode is in an upward facing vertical state or a horizontal state. In the case that the state of the input device 11 is determined to be a horizontal state, the processing is returned to step S23. That is to say, in the case that the state of the input device 11 is a horizontal state, the executing processing of the pointer operation in step S23 is repeated.

In the case determination is made in step S24 that the input device 11 is an upward facing vertical state, i.e. in the case that the angle α is within the first threshold, in step S25 the determining unit 154 determines whether the upward facing vertical state has been detected M times consecutively. Even if the upward facing vertical state is detected, in the case of not being detected M (M≥2) times consecutively, the processing is returned to step S23, and the processing thereafter is repeated.

In the case that the upward facing vertical state is detected M times consecutively, the setting unit 152 disengages the pointing mode in step S26.

In the pointing mode used while the input device 11 is in a basically horizontal state, in the case that the upward facing vertical state is detected even once, the pointing mode can be disengaged immediately. However, with such an arrangement, in the case that the user erroneously positions the input device 11 in the upward facing vertical state, the pointing mode is disengaged and operability deteriorates. Thus, only in the case of detection M times consecutively is the pointing mode disengaged.

For example, in the case that the state of the input device 11 is detected with a sampling interval of 15 ms, if M=6, then 75 ms (=15×(6−1)) becomes the threshold, so when the upward facing vertical state is continued 75 ms or longer, the pointing mode is disengages. This determination can be realized by a comparatively simple software algorithm.

Thus, according to the present embodiment, two thresholds of the state angle and the state holding time are provided. The state angle is effective in preventing erroneous detection by an unexpected angle change during operation. The state holding time is effective in preventing erroneous detection resulting from inertial force from a sudden motion change.

Upon the pointing mode having been disengaged in step S26, in step S27 the setting unit 152 sets the zoom mode. That is to say, as shown in FIG. 7, upon the first gesture operation having been performed and the input device 11 having been changed from a horizontal state to an upward facing vertical state, the pointing mode is disengaged and the zoom mode is set. The zoom mode is a mode to expand and reduce the screen display according to the operation amount of the input device 11.

Note that in the case determination is made in step S21 that the input device 11 is in the vertical upward facing state, the processing in steps S22 through S26 are skipped, and immediately the zoom mode is set in step S27.

Figure 9:
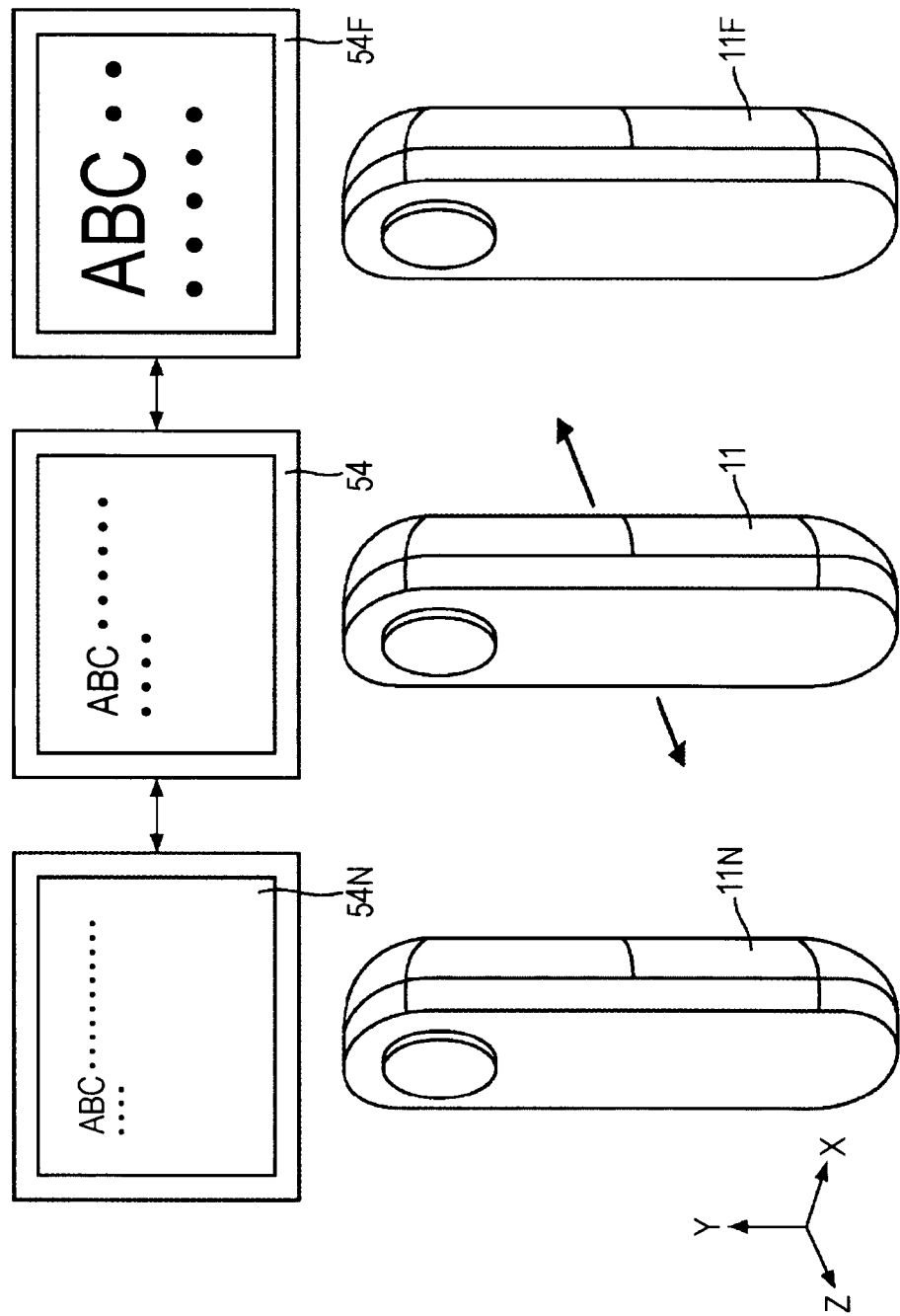
FIG. 9 is a diagram describing a second gesture.

The user operates a second gesture in the case of expanding or reducing the screen display. FIG. 9 is a diagram describing the second gesture. As shown in the diagram, the second gesture is a parallel movement gesture to move the input device 11 in a parallel motion which in the upward facing vertical state to a position nearing the user as denoted by the reference numeral 11N and to a position farther from the user as denoted by the reference numeral 11F.

Thus the determining unit 154 determines in step S28 whether the main unit has moved forward or backward. In the case that main unit 41 is moved forward, i.e. in the case that the main unit 41 is moved in the direction nearing the user, the acceleration Ay(t) in the Y" axis direction in FIG. 2 becomes a predetermined value according to the positive (or negative) operating amount. Conversely, in the case that the main unit 41 is moved backwards, i.e. in the case that the main unit 41 is moved in the direction farther away from the user, the acceleration Ay(t) in the Y" axis direction in FIG. 2 becomes a predetermined value according to the negative (or positive) operating amount. Thus, in the case that the value of the acceleration Ay(t) value is nearly 0, determination can be made that the main unit 41 has not moved, or if it has moved, the direction thereof has been to the left and right. In this case, the main unit 41 is determined to not have moved in the backward/forward direction. Conversely, in the case predetermined values according to the positive or negative operating amount are detected, the main unit 41 is determined to have moved in the backward/forward direction.

In the case that the main unit 41 is determined to be moved in the backward/forward direction, in step S29 the output unit 155 expands or reduces the screen display. Which of expansion or reduction it will be, is determined according to the polarity of the acceleration Ay(t). For example, in the case that the acceleration Ay(t) is positive, the screen display is reduced (or expanded), and in the case of negative, expanded (or reduced). The expansion rate (or reduction rate) can be controlled in accordance with the size of the angular velocity ωψ(t) around the Y' axis which takes into consideration the acceleration Ay(t), the size of the angular velocity ωψ(t) around the Y' axis, or a later-described virtual radius R. That is to say, according to the movement speed of the input device 11, the motion speed of the zoom mode can be controlled.

In the case that the user moves the input device 11 from the position denoted by the reference numeral 11 to the position denoted by the reference numeral 11N, the image on the display unit 54 is reduced, as shown in the display unit denoted by the reference numeral 54N. Conversely, in the case that the input device is moved from the position denoted by the reference numeral 11 to the position denoted by the reference numeral 11F, the image on the display unit 54 is expanded, as shown in the display unit denoted by the reference numeral 54N.

The second gesture is a parallel movement change of state, whereby distinguishing between the first gesture and third gesture which is a rotational movement change is simple.

In the case of setting the pointing mode when in the zoom mode, the user operates the third gesture. In step S30 the determining unit 154 determines again whether the state of the input device 11 is an upward facing vertical state or a horizontal state. In the case that the state of the input device 11 is determined to be an upward facing vertical state, the processing is returned to step S28. That is to say, in the case that the state of the input device 11 remains as the upward facing vertical state, the processing to expand or reduce the screen display in step S29 is repeated.

In the case determination is made in step S28 that the main unit 41 is not moving backward/forward, the determining unit 154 determines in step S30 which of an upward facing vertical state or a horizontal state is the state of the input device 11. In the case that the state of the input device 11 is determined to be an upward facing vertical state, the processing is returned to step S28, and the processing thereafter is repeated. That is to say, in the case that the state of the input device 11 in zoom mode is an upward facing vertical state, if the main unit 41 is not moved backward/forward, actual processing is not performed.

In the case that the state of the input device 11 is determined in step S30 to be a horizontal state, i.e. in the case the state of the input device 11 in zoom mode is in a horizontal state, in step S31 the determining unit 154 determines whether the horizontal state has been detected N times consecutively. Even if the horizontal state is detected, in the case of not being detected N (N≥2) times consecutively, the processing is returned to step S28, and the processing thereafter is repeated. That is to say, the zoom mode is continued.

In the case that the horizontal state is detected N times consecutively, i.e. in the case that the horizontal state is maintained consecutively for a sampling time×(N−1) time, the setting unit 152 in step S32 disengages the zoom mode. Upon the zoom mode having been disengaged, the processing is returned to step S22, and the setting unit 152 sets the pointing mode.

If the zoom mode is immediately disengaged in the case that the horizontal state is detected even once in zoom mode, the zoom mode will be disengaged in the case that the user erroneously places the input device 11 in a horizontal state, thereby deteriorating operability. Thus, only in the case of detection N times consecutively is the zoom mode disengaged.

Thus, upon the input device 11 becoming in an upward facing vertical state (upon the first gesture operation having been performed), the zoom mode is set. However, once the zoom mode is set, as long as the input device 11 does not become in the horizontal state (as long as the third gesture operation is not performed), the zoom mode is maintained and not disengaged. Thus, a zoom operation, which is a parallel motion gesture whereby an input device 11 having the front end in an upward facing vertical state such as shown in FIG. 9 is moved nearer to or farther from the user, can be performed in a stable manner. That is to say, even if the state of the input device 11 slopes greatly to an angle nearing a horizontal state temporarily during the operation, the zoom mode is still maintained.

Also, upon the input device 11 becoming in a horizontal state (upon the third gesture operation having been performed), the pointing mode is set. However, as described in the processing of steps S21 through S26, once the pointing mode has been set, as long as the input device does not become in the upward facing vertical state (as long as the first gesture operation is not performed), the pointing mode is maintained and not disengaged. Thus, the operation shown in the drawings to move the input device 11, which is in a roughly horizontal state having the front end thereof facing the direction of the display unit 54, in an optional direction in a three-dimensional free space and moving the pointer in an optional direction, can be performed in a stable manner. That is to say, even if the state of the input device 11 slopes greatly to an angle nearing an upward facing vertical state temporarily during the operation, the pointing mode is still maintained.

Note that the processing in FIG. 6 is ended when the same routine between adjacent steps are repeated a preset number of times, or when a predetermined amount of time has passed within the same step. Further, upon the user performing an operation such as releasing a button that has been pressed during the operation, operating a defined stop button, or removing a finger from a photo-type touch sensor. Thus, the user can change the mode by changing the state of the input device 11 in a predetermined direction in a three-dimensional space.

Note that the mode to be controlled is not limited to the pointing mode and zoom mode. A scrolling mode to scroll the display image, a channel forward/return mode to change the channel, an audio increase/decrease mode to increase/decrease the audio volume, and other modes can be controlled. Also, the gestures of the input device 11 are not limited to the cases shown in FIGS. 7 through 9.

Figure 10A:
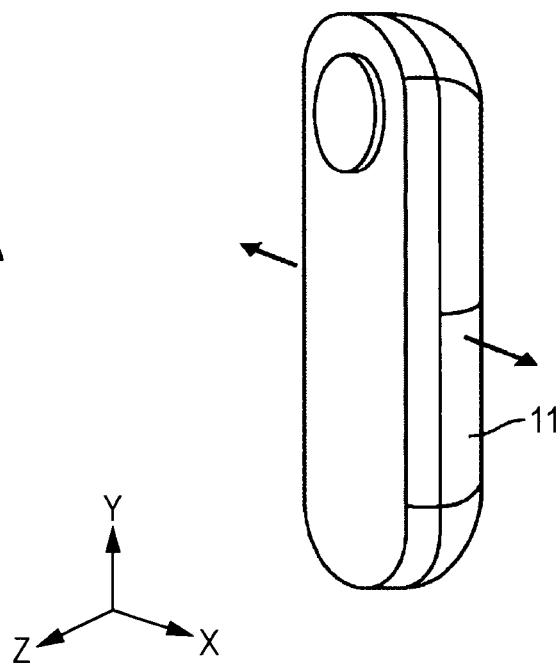
FIGS. 10A and 10B are diagrams describing another gesture.
Figure 10B:
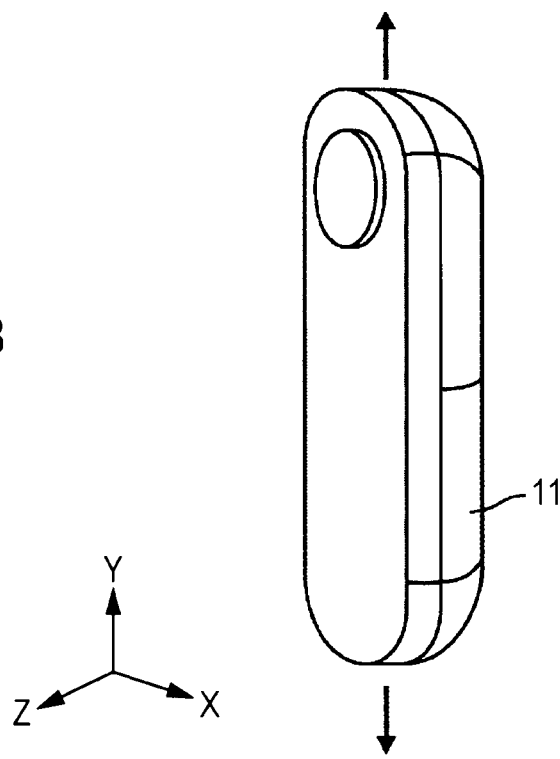

FIGS. 10A and 10B are diagrams to describe other gestures. As shown in FIGS. 10A and 10B, an operation for parallel movement in the left/right direction while remaining in the upward-facing vertical state (FIG. 10A) or an operation for parallel movement in the vertical direction (FIG. 10B) can be the second gesture, for example.

Figure 11:
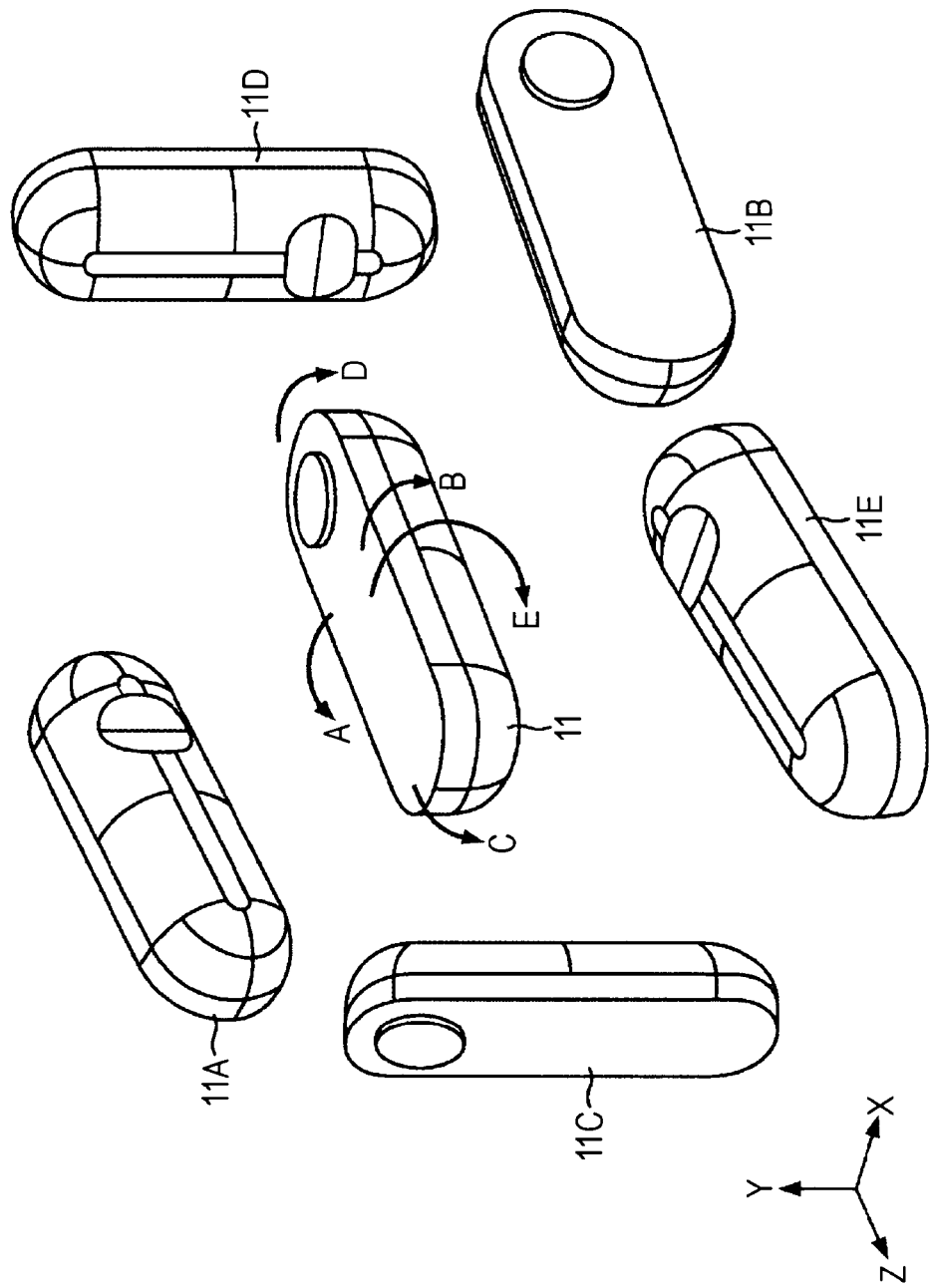
FIG. 11 is a diagram describing another gesture.

FIG. 11 is a diagram to further describe other gestures. As shown in the diagram, upon rotating the input device 11 90 degrees from the horizontal state which is the base denoted by the reference numeral 11 in a direction C so that the front end thereof is facing upward, the input device 11 becomes in the upward facing vertical state denoted by the reference numeral 11C. The state thereof is the state shown in FIG. 7.

Also, upon rotating the input device 11 from the horizontal state 90 degrees in a direction D so that the front end thereof is downward, the input device 11 becomes in a downward facing vertical state denoted by the reference numeral 11D.

Also, upon rotating the input device 11 from the horizontal state 90 degrees in a counter-clockwise direction A, the input device 11 becomes in the state rotated 90 degrees in the counter-clockwise direction denoted by the reference numeral 11A. Upon rotating the input device 11 from the horizontal state 90 degrees in a clockwise direction B, the input device 11 becomes in the state rotated 90 degrees in the clockwise direction denoted by the reference numeral 11B. Upon rotating the input device from the horizontal state 180 degrees in the clockwise direction B, the input device 11 becomes in a backward facing state denoted by the reference numeral 11E. These gestures can be the first gesture or the third gesture, for example.

Using such a gesture, functions similar to the above-described cases can be realized. By combining such gestures as the first through third gestures, the user can perform operations intuitively.

2. Second Embodiment

Command Transmission Processing 2

Figure 12:
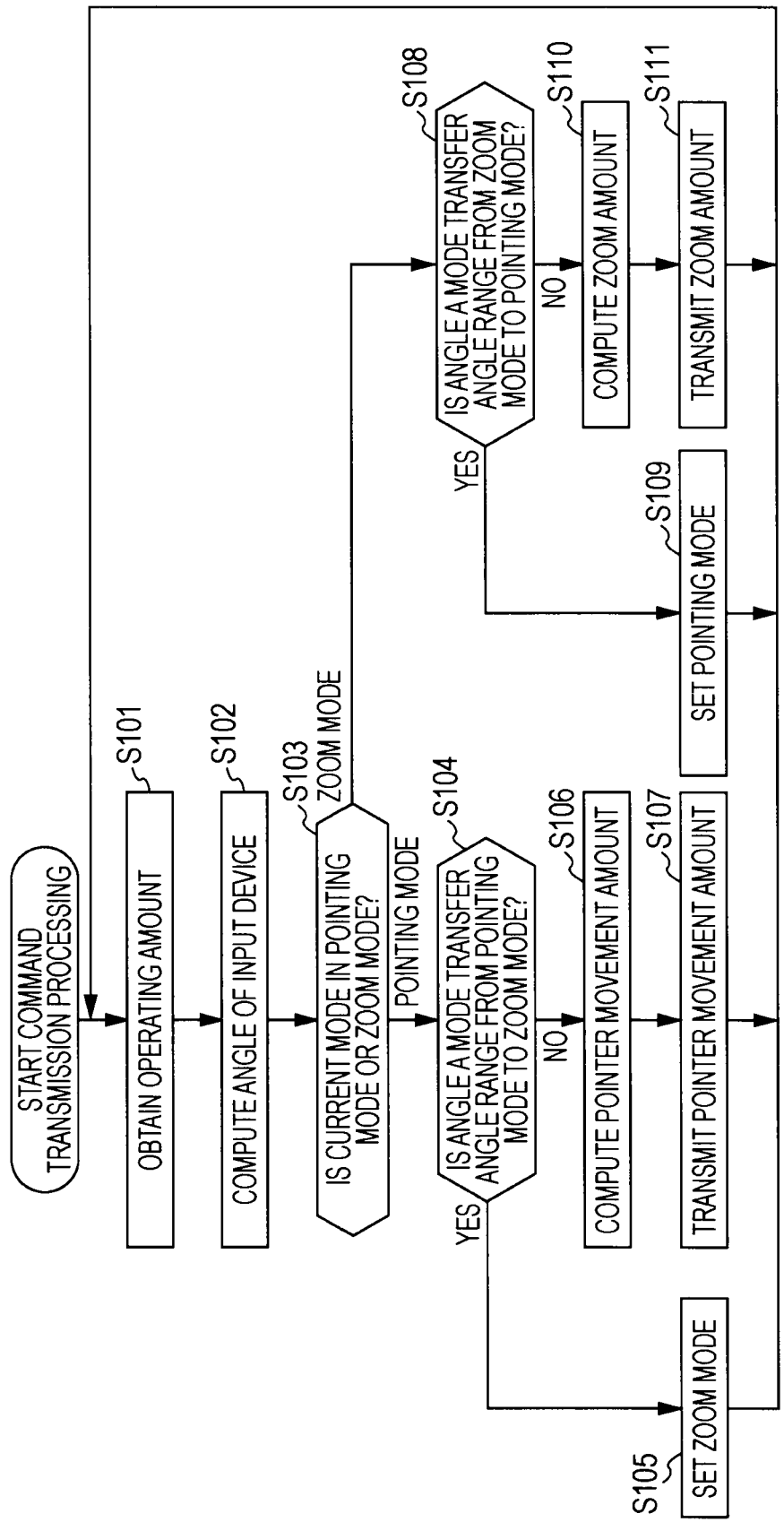
FIG. 12 is a flowchart describing command transmission processing.

FIG. 12 is a flowchart describing other command transmission processing that the input device 11 executes. According to the present embodiment, management of the modes is performed at the input device 11 side also.

That is to say, the obtaining unit 101 obtains the operating amount in step S101. In the case that the user grasps the input device 11 and operates in a three-dimensional free space, the acceleration sensor 31 and angular velocity sensor 32 detect the operation amount corresponding to the operation thereof. The acceleration (Ay(t), Az(t)) of the Y" axis and Z" axis detected by the acceleration sensor 31 and the angular velocity ($\omega\psi(t)$, $\omega\phi(t)$) around the Y' axis and Z' axis detected by the angular velocity sensor 32 are obtained here. Alternatively, the acceleration Ax(t) of the X" axis may be further obtained. Also, in the case that the button of the input device 11 is operated, the operating signal thereof is also obtained.

In step S102 the computing unit 102 computes the angle of the input device. The pitch angle $\alpha$ as to the Y-axis of the input device 11 can be computed from the following Expression, based on the acceleration Ay(t) of the Y" axis and the acceleration Az(t) of the Z" axis.

$$\alpha = \arctan(Az(t)/Ay(t)) \quad (1)$$

The determining unit 103 in step S103 determines which of the pointing mode and zoom mode the current mode is in. In the case that the zoom mode or pointing mode is set in the later-described steps S105 and S109, this is stored, whereby determining can be performed from such storing.

In the case that the current mode is the pointing mode, the determining unit 103 determines in step S104 whether the angle of the input device 11 is in a mode transition angle range from pointing mode to zoom mode. For example as shown in FIG. 7, in the case that the input device 11 is in the upward facing vertical state, i.e. in the case that the angle $\alpha$ as to the Y-axis of the input device 11 is within 10 degrees, the setting unit 104 sets the zoom mode in step S105. The current mode at this time is stored as zoom mode. Based on this storing, the determining in step S103 described above is performed.

Subsequently, the processing is returned to step S101, the operating amount based on the operations of the user is obtained again, and the angle of the input device 11 is computed in step S102. In this case, the zoom mode is set, so the determining unit 103 determines in step S108 whether the angle of the input device 11 is in a mode transition angle range from zoom mode to pointing mode. For example, as shown in FIG. 8, in the case that the input device 11 is in the upward facing vertical state, i.e. in the case that the angle as to the Z-axis of the input device 11 is within 10 degrees, i.e. in the case of a horizontal state, determination is made that the input device 11 is in the mode transition angle range from zoom mode to pointing mode.

In the case that the angle of the input device 11 is not in the mode transition angle range from zoom mode to pointing mode, the computing unit 102 computes the zoom amount in step S110. That is to say, a zoom amount such as shown in FIG. 9 for example is computed, based on the movement amount in the Z-axis direction of the input device 11 that is in an upward facing vertical state. In step S111 the transmitting unit 105 transmits a command showing the zoom amount computed in step S110. Also, commands of button information relating to the operated button are also transmitted as appropriate. Specifically, the command is modulated with the communication unit 35, and transmitted by radio waves to the image display device 12 via the antenna 36.

Note that at this time, the operation that the user is performing is a zoom operation, and is not an operation to move the pointer. Thus, a command can be transmitted to show that the pointer movement amount is 0 so as to inhibit the pointer movement.

As will be described later with reference to FIG. 13, upon receiving a command, the image display device 12 executes processing corresponding thereto. Accordingly, as shown in FIG. 9 a movement operation is performed in the Z-axis direction while the input device 11 is in the upward facing vertical state, i.e. the second gesture is performed, whereby the image of the display unit 54 can be expanded/reduced (zoomed).

In the case of the user switching the mode from the zoom mode to pointing mode, as shown in FIG. 8 the third gesture is performed and the input device 11 is modified from an upward facing vertical state to a horizontal state. In this case, in the state of determination having been made in step S103 that the current mode is zoom mode, the angle of the input device 11 is determined in step S108 to be in the mode transition angle range from zoom mode to pointing mode. As a result, the setting unit 104 sets the pointing mode in step S109. At this time information to the effect that the current mode is the pointing mode is stored. The determination is the above-described step S103 is performed based on the storing herein.

Subsequently, the processing is returned to step S101, the operation amount based on the operation of the user is obtained again, and in step S102 the angle of the input device 11 is computed. In this case, the pointing mode is set, so the determining unit 103 determines in step S104 whether the angle of the input device 11 is in the mode transition angle range from pointing mode to zoom mode. For example as shown in FIG. 7, in the case that the angle as to the Y-axis of the input device 11 is 10 greater than 10 degrees, determination is made that this is not in the mode transition angle range from pointing mode to zoom mode. In this case, the processing of step S105 is not performed. That is to say the pointing mode is maintained without change.

In step S106, the computing unit 102 computes the movement amount of the pointer. That is to say, the movement amount of the pointer is computed based on the operating amount obtained in step S101. For example, the movement amount of the pointer is computed by multiplying a predetermined coefficient by the acceleration (Ax(t), Ay(t)).

In step S107 the transmitting unit 105 transmits a command showing the movement amount of the pointer computed in step S106. Also, the command of the button information relating to the operated button is transmitted. Specifically, the command is modulated by the communication unit 35, and transmitted by radio waves to the image display device 12 via the antenna 36. At this time, the operation that the user performs is a pointer moving operation or an object moving operation, and is not an operation to zoom the image. Thus, a command can be transmitted to show that the zoom amount is 0 so as to inhibit the pointer movement.

As described above, upon receiving a command, the image display device 12 executes processing corresponding thereto. Accordingly, the user operates to move the input device 11 in an optional direction in a three-dimensional free space while the input device 11 is in the horizontal state, whereby the pointer can be moved in the desired direction.

Following the processing in step S107, the processing is returned to step S101, and the processing thereafter is repeated.

Note that the mode setting may be performed on the image display device 12 side. In this case, in steps S105 and S109, the signals to set each of the zoom mode and pointing mode are transmitted.

Thus, by changing the state of the input device 11, the user can switch between the functions of the zoom mode and pointing mode.

Display Control Processing 2

Figure 13:
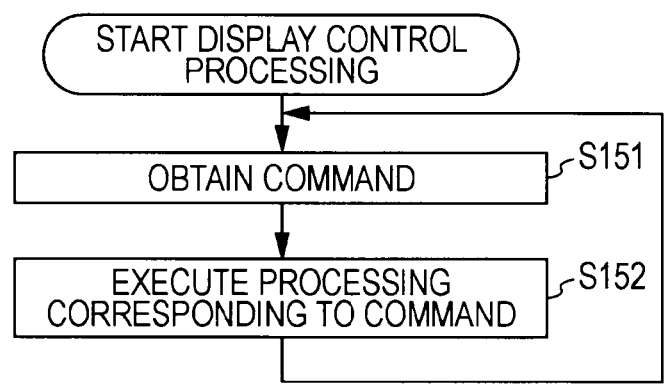
FIG. 13 is a flowchart describing display control processing.

FIG. 13 is a flowchart to describe the display control processing that the image display device 12 executes, corresponding to the command transmission processing in FIG. 12.

In step S151 the obtaining unit 151 obtains a command. That is to say, the command transmitted in steps S107 and S111 in FIG. 12 is received by the communication unit 52 via the antenna 51, demodulated, supplied to the computing unit 53, and obtained.

In step S152, the executing unit 103 executes processing corresponding to the command obtained in step S151. Specifically, the pointer is moved and displayed on the display unit 54, based on the pointer movement amount transmitted in step S107 of FIG. 12. Also, the image is zoomed on the display unit 54, based on the zoom amount transmitted in step S111.

Figure 14A:
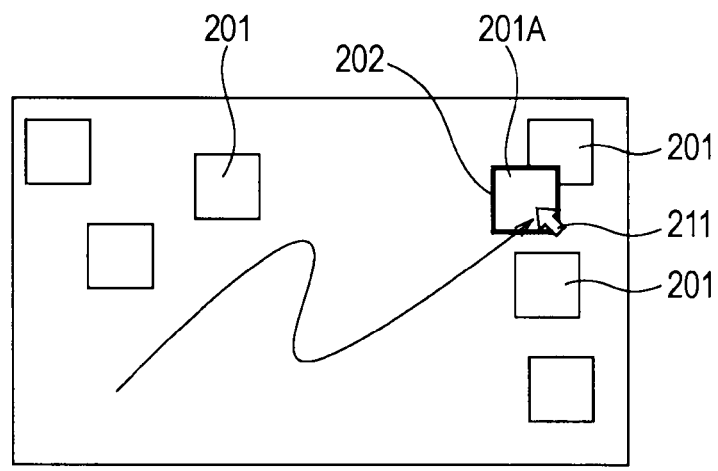
FIGS. 14A and 14B are diagrams illustrating a display example when in pointing mode.
Figure 14B:
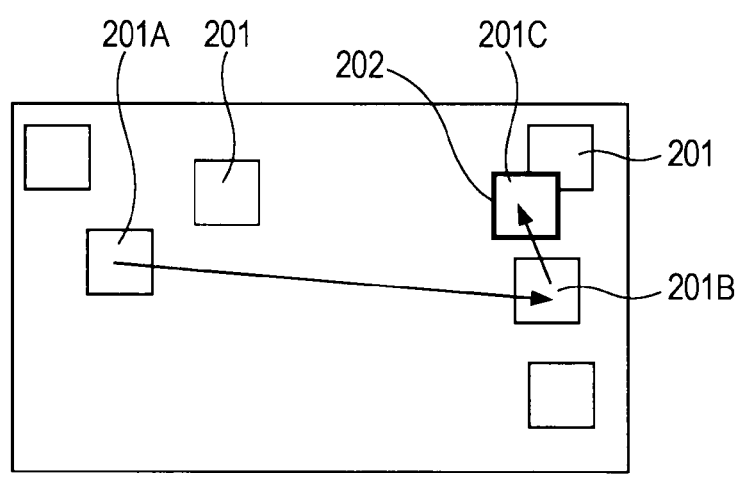

FIGS. 14A and 14B are diagrams showing a display example when in pointing mode. Note that in FIGS. 14A and 14B, 201 is a reference numeral common to each object, and 201A through 201C are reference numerals indicating identified objects therein.

FIG. 14A shows the state of the pointer 211 moving in a non-linear manner, based on moving operations that include hand trembling in the three-dimensional free space of the input device 11. Further, upon the determining button (not shown) of the input device 11 having been operated, an object 201A which is one of multiple objects 201 that the pointer 211 is positioned at is selected, and a frame 202 is displayed in the periphery thereof.

Note that determining can be commanded instead of the operation of the determining button. For example, an object 201 can be selected in the case that the pointer 211 is stopped on the object 201 a preset amount of time or longer. Also, the object 201 can be selected in the case that the pointer 211 is stopped on the object 201 a preset amount of time or longer, and the angular velocity is greater than a preset amount of time and less than a preset value. Alternatively, the object 201 can be selected in the case of performing an operation (gesture) to surround the periphery of the object 201 with the pointer 211.

In FIG. 14B, first, the object 201A is selected by an invisible virtual pointer. Next, the user moves/operates the input device 11 in the right horizontal direction. Consequently, the selected object is changed into an object 201B which is the object closest to the object 201A positionally (in this case, positioned slightly lower in the horizontal direction), of the objects positioned in the operating direction (i.e. the right horizontal direction). Thereafter, the user further moves/operates the input device 11 in the direction straight up. Consequently, the selected object is changed into an object 201C which is an object closest to the object 201B positionally (in this case, positioned slightly to the left from the straight up direction), of the objects positioned in the operating direction (i.e. the straight up direction). Note that the object closest positionally is the object that is positioned nearest within a predetermined angle range with the operating direction by the user as the center. Thus according to the present embodiment, the selected objects are sequentially moved with each moving operation of the input device 11.

Figure 15A:
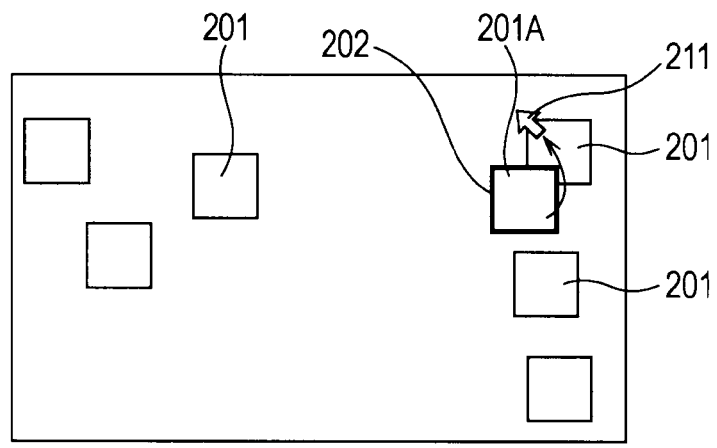
FIGS. 15A and 15B are diagrams illustrating a display example when in zoom mode.
Figure 15B:
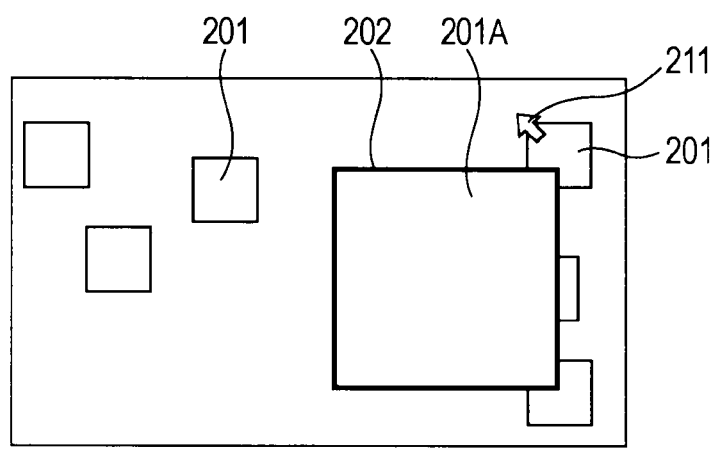

FIGS. 15A and 15B are diagrams showing a display example while in zoom mode. In FIG. 15A, the object 201A is selected. In this state, the mode is changed from cursor mode to zoom mode, and upon a zoom operation having been performed in the upward facing vertical state, as shown in FIG. 15B, the object 201A selected at that point in time is zoomed. In the display example in FIG. 15B, the object 201A in FIG. 15A is displayed in an expanded view.

Figure 16A:
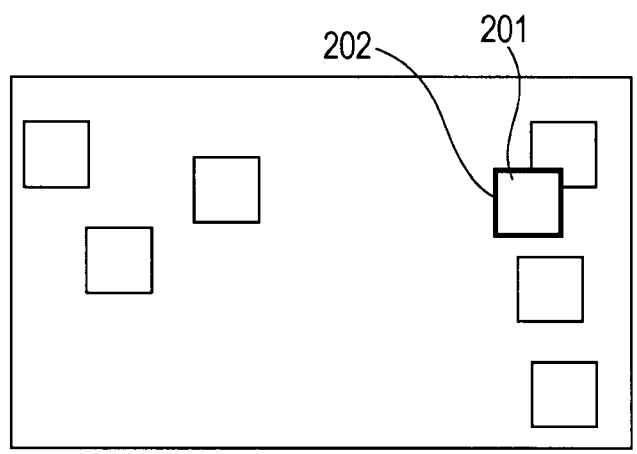
FIGS. 16A and 16B are diagrams illustrating a display example when in zoom mode.
Figure 16B:
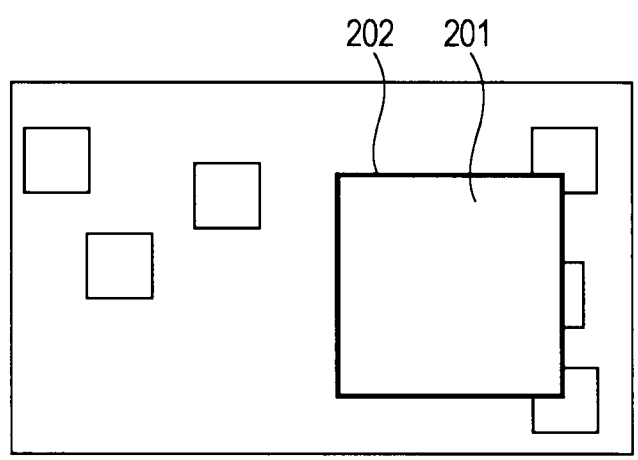

FIGS. 16A and 16B are diagrams showing a display example while in another zoom mode. As we can see from a comparison of FIGS. 15A through 16B, in the display example of the zoom mode in FIGS. 16A and 16B, the pointer 211 in FIGS. 15A and 15B has been deleted.

3. Third Embodiment

Command Transmission Processing 3

FIG. 17 is a flowchart describing other command transmission processing that the input device 11 executes. The processing in steps S201 through S215 in FIG. 17 is basically similar to the processing in steps S101 through S111 in FIG. 12. However, in the case of the embodiment in FIG. 17, in the case that the angular velocity of the input device 11 is great, the pointer moving amount and the zoom amount are restricted.

That is to say, in FIG. 12, the computing processing of the pointer moving amount in step S106 is performed after the determining processing in step S104 of "is the angle in the mode transition angle range from pointing mode to zoom mode?" Conversely, in FIG. 17, the processing in step S206 that corresponds to step S106 in FIG. 12 is executed in the previous state of step S207 in FIG. 17 which corresponds to step S104 in FIG. 12.

In FIG. 17, in the case determination is made in step S203 which corresponds to step S103 in FIG. 12 that the current mode is the pointing mode, determining processing by the determining unit 103 is performed in step S204. That is to say, determination is made as to whether the size of angular velocity obtained in step S201 is at a threshold or greater.

The absolute value of the angle detected by the angular velocity sensor 32, for example, can be used for the size of angular velocity. Specifically, the absolute value $|\omega\theta(t)|$ or $|\omega\psi(t)|$ of the angular velocity of the pitch angle $\theta$ and yaw angle $\psi$ that rotate with the pitch rotation axis and yaw rotation axis parallel to the X' axis and Y' axis respectively can be used. The angular velocity in this case is a value on a relative coordinate system based on the coordinate axis of the input device 11.

Alternatively, the absolute value of the roll angular velocity (e.g., can be obtained from the temporal differentiation of the resultant vector of the acceleration Ax(t), Ay(t) detected by the acceleration sensor 31) can be used as the size of the angular velocity. Further, the absolute value of the angular velocity of the pitch angle $\theta$ and yaw angle $\psi$ in the gravity coordinate system (absolute coordinate system) computed from the angular velocity detected by the angular velocity sensor 32 and the acceleration detected by the acceleration sensor 31 can also be used.

In the case that the size (absolute value) of the angular velocity is smaller than a preset threshold, processing to compute the pointer movement amount is performed with the computing unit 102 in step S206. In the case determination is made in step S207 by the determining unit 103 that the angle is not in the mode transition range from pointing mode to zoom mode, in step S209 the pointer movement amount computed in step S206 is transmitted to the image display device 12. That is to say, the processing in this case is processing similar to the case in FIG. 12.

Conversely, in the case determination is made that the size of the angular velocity is at a threshold or higher, in step S205 the computing unit 102 sets a restriction value to the movement amount. Specifically, for example 0 is set as the movement amount. Alternatively, the movement amount is set with a weakened sensitivity. That is to say, even if the operating amount of the input device 11 is great, setting is performed so that the pointer does not move, or even if it moves the movement amount is small. In step S209, the movement amount with a restriction value thus set is transmitted.

That is to say, in the case that the angular velocity is greater than the preset threshold, a movement amount with a set restriction value is transmitted. In the case that the user rotates the input device 11 in the lengthwise direction as shown in FIG. 7 or 8 for mode changes, this is a rotation operation so the size of the angular velocity becomes greater. This operation is a mode change operation and is not an operation to move the pointer, so it is desirable for the pointer to not move, or if it moves the movement amount thereof is small. That is to say, the size of the angular velocity being large means that the angle change of the input device 11 (state change) is fast. This means that the mode is in process of changing. Thus, in the case that the mode is changed, the operability is improved by restricting the processing of the mode before changing.

Thus, the following advantages can be obtained. For example in FIG. 15A, let us say that the pointer 211 is positioned on top of the object 201A. In this state, in the case the user switches the mode from pointing mode to zoom mode, as shown in FIG. 7 the input device 11 rotates in the lengthwise direction. However, the movement of the pointer 211 is restricting from being moved by this operation. That is to say, the pointer 211 does not move from the object 201A, or even if it moves the distance thereof is small.

Also, in the state shown in FIG. 16A, even in the case that the user switches the mode from pointing mode to zoom mode, the movement of the pointer 211 by the operation thereof is restricted. Accordingly, this suppressed an occurrence such as the object 201 in the selection state displayed by the frame 202 being moved to another object.

Similarly, in FIG. 12, the computing processing to the zoom amount in step S110 is performed following the determining processing in step S108 of "Is the angle in the mode transition angle range from zoom mode to pointing mode?" Conversely, in FIG. 17, the processing in step S212 that corresponds to step S110 in FIG. 12 is executed in the previous step of step S213 in FIG. 17 which corresponds to step S108 in FIG. 12.

In FIG. 17, in the case determination is made in step S203 which corresponds to step S103 in FIG. 12 that the current mode is zoom mode, the determining processing by the determining unit 103 is performed in step S210. That is to say, determination is made as to whether the size of the angular velocity obtained in step S201 is at or greater than the threshold.

In the case that the size of the angular velocity is smaller than the preset threshold, processing to compute the zoom amount with the computing unit is performed in step S212. In the case the determining unit 103 determines in step S213 that the angle is not in the mode transition range from zoom mode to pointing mode, in step S215 the zoom amount computed in step S212 is transmitted to the image display device 12. That is to say, the processing in this case is processing similar to the case in FIG. 12.

Conversely, in the case determination is made in step S210 that the size of the angular velocity is at or above a threshold, in step S211 the computing unit 102 sets a restriction value to the zoom amount. Specifically, for example, 0 is set as the zoom amount. Alternatively, the zoom amount is set with a weakened sensitivity. That is to say, setting is performed so that even if the operating amount of the input device is great, there is no zooming, or if there is zooming, the zooming amount is small. In step S215 the zoom amount having a restricted value thus set is transmitted.

That is to say, in the case the size of the angular velocity is greater than the preset threshold, the zoom amount having a restricted value thus set is transmitted. The user is changing modes, so in the case the input device 11 is rotated in the lengthwise direction as shown in FIG. 7 or 8, this is a rotation movement, and accordingly the size of angular velocity becomes greater. This operation is a mode changing operation and is not a zooming operation, so it is desirable for there to be no zooming, or if there is zooming the amount thereof is small. Thus, in the case that the mode is changed (i.e. in the case of being in the process of changing), the operability is improved by restricting the processing of the mode before changing.

The other processing is similar to the case in FIG. 12, so redundant description thereof will be omitted. Also, the processing performed on the display device 12 side corresponding to the processing in FIG. 17 is similar to the case shown in FIG. 13, so description thereof will be omitted.

Note that by slowly rotating the input device 11 in the lengthwise direction, i.e. by rotating so that the size of the angular velocity is not greater than the threshold, the state of the input device 11 can be changed without changing the mode.

4. Fourth Embodiment

Command Transmission Processing 4

Figure 18:
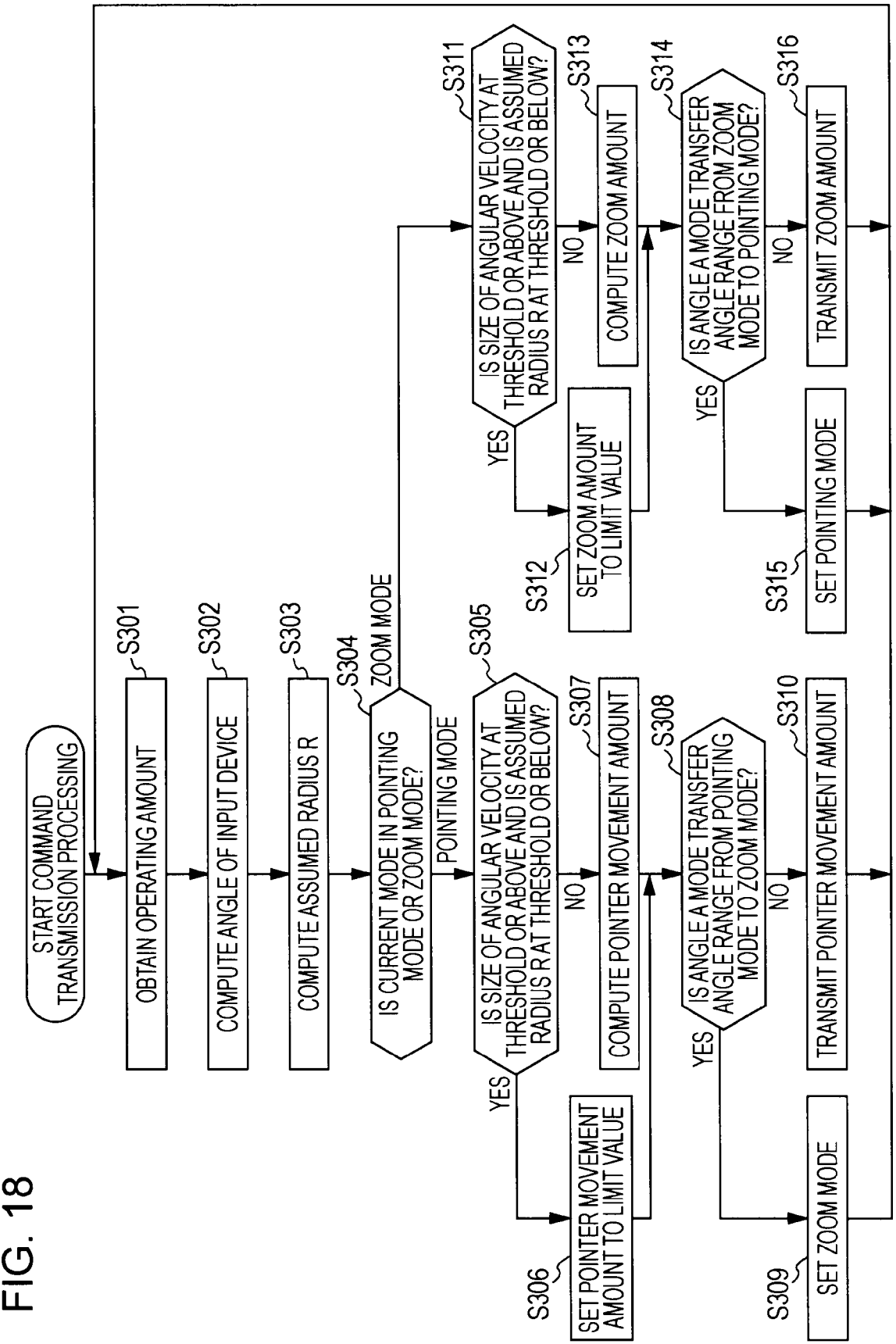
FIG. 18 is a flowchart describing command transmission processing.

FIG. 18 is a flowchart that describes yet another command transmission processing which the input device 11 executes. The processing in steps S301 through S316 in FIG. 18 is processing basically similar to the processing in steps S201 through S215 in FIG. 17.

However, according to the embodiment shown in FIG. 18, determination is made in steps S305 and S311, which correspond to steps S204 and S210 in FIG. 17, whether the size of the angular velocity is at or above a preset threshold and a virtual radius R is at or below the threshold. Therefore, in step S303 before the current mode determining processing in step S304, which corresponds to step S203 in FIG. 17, the processing to compute the virtual radius R is performed with the computing unit 102.

The virtual radius R is computed as follows, for example. The speed of the input device 11 is found by multiplying the angular velocity by the rotation radius. That is to say, the movement of the input device 11 in the case of the user operating the input device 11 is a combination of the rotation movement centering on the shoulder, elbow, or wrist and so forth of the user. The rotation radius thereof becomes distance from the rotation center that changes for each combined time period of rotation movement to the input device 11.

The angular velocity $\omega\theta(t)$ around the X' axis has a motion component in the Y-axis direction, and the angular velocity $\omega\psi(t)$ around the Y' axis has a motion component in the X-axis direction. Accordingly, if the speed in the X-axis direction and Y-axis direction of the input device 11 is (Vx(t), Vy(t)), the rotation radius (Rx(t), Ry(t) is expressed in the following Expression.

$$(Rx(t),Ry(t))=(Vx(t),Vy(t))/(\omega\psi(t),\omega\theta(t)) \quad (2)$$

(Vx(t), Vy(t)) and ($\omega\psi(t)$, $\omega\theta(t)$) on the right side of Expression (2) are dimensions of speed. Even if the speed and angular velocity expressed on the right side of Expression (2) are each differentiated, and caused to be dimensions of the acceleration (or angular velocity) or of a temporal change rate of the acceleration (or angular velocity), the correlation is not lost. Similarly, even if the speed and angular velocity are each integrated and caused to be phase dimensions, the correlation is not lost.

Accordingly, the following Expression (3) through Expression (5) are obtained with the speed and angular velocity shown on the right side of Expression (2) as dimensions of phase, acceleration (or angular velocity), and temporal change rate of acceleration (or angular velocity).

$$(Rx(t),Ry(t))=(x(t),y(t))/(\psi(t),\theta(t)) \quad (3)$$

$$(Rx(t),Ry(t))=(Ax(t),Ay(t))/(\Delta\omega\psi(t),\Delta\omega\theta(t)) \quad (4)$$

$$(Rx(t),Ry(t))=(\Delta Ax(t),\Delta Ay(t))/(\Delta(\Delta\omega\psi(t)),\Delta(\Delta\omega\theta(t))) \quad (5)$$

Of the above expressions, if we focus of Expression (5) for example, we can see that if the change rate ($\Delta Ax(t)$, $\Delta Ay(t)$) of the acceleration (Ax(t), Ay(t)) and the change rate ($\Delta(\Delta\omega\psi(t))$, $\Delta(\Delta\omega\theta(t))$) of the angular velocity ($\Delta\omega\psi(t)$, $\Delta\omega\theta(t)$) are known, the rotation radius (Rx(t), Ry(t)) can be found. According to the present embodiment, the radius (Rx(t), Ry(t)) is obtained based on Expression (5).

The computing unit 102 derives the acceleration (Ax(t), (Ay(t)) as the detection value taken in from the acceleration sensor 31, and computes the change rate ($\Delta Ax(t)$, $\Delta Ay(t)$). Also, the computing unit 102 takes the angular velocity as a second-order derivative as a detection value taken in from the angular velocity sensor 32, and computes the change rate ($\Delta(\Delta\omega\psi(t))$, $\Delta(\Delta\omega\theta(t))$) of the angular velocity ($\Delta\omega\psi(t)$, $\Delta\omega\theta(t)$). The computing unit 102 computes the rotation radius (Rx(t), Ry(t)) based on Expression (5).

In steps S305 and S311, in the case that the size of angular velocity is at or above a preset threshold and the virtual radius R is at or below the threshold, the operation thereof is determined to be an operation at the time of mode transitioning. Upon determination having been made that the operation thereof is an operation at the time of mode transitioning, the processing in steps S306 and S312 which corresponds to steps S205 and S211 in FIG. 17 is executed. That is to say, a restricted value is set for the pointer movement amount in step S306, and a restricted value is set for the zoom amount in step S312.

Subsequently, in steps S310 and S316 which correspond to steps S209 and S215 in FIG. 17, the pointer movement amount or zoom amount having a restricted value set are each transmitted. Other operations herein are similar to the case in FIG. 17 so the descriptions thereof will be omitted.

In the case of moving the pointer and zooming, the user operates the input device 11 by comparatively stretching out the arm. Conversely, a mode changing operation such as shown in FIGS. 7 and 8 are performed by turning the wrist. Consequently, the virtual radius R which is the distance from the input device 11 to the fulcrum of the rotation movement is shorter in the case of the time of mode changing than in the case of moving the pointer and zooming. Accordingly, by performing determination based not only on the size of the angular velocity but on the size of the virtual radius R, determination can more accurately as to whether the operation is for mode changing or the operation is for pointing.

The image display device 12, having received commands transmitted from the input device 11, executes the display control processing in FIG. 13 for example, which is also similar to the case of the embodiment shown in FIG. 17.

5. Fifth Embodiment

Command Transmission Processing 5

Figure 19:
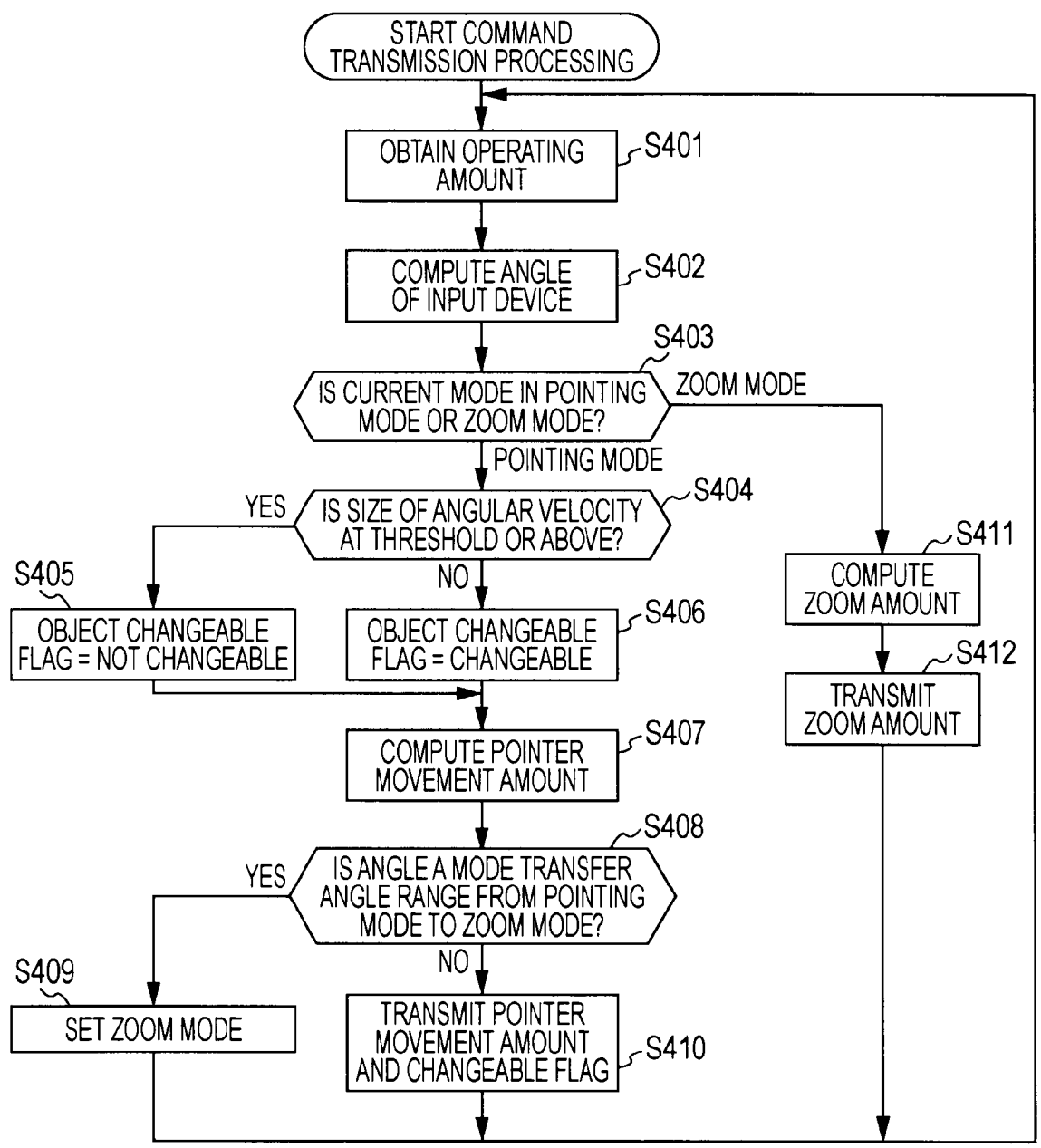
FIG. 19 is a flowchart describing command transmission processing.

FIG. 19 is a flowchart describing yet another command transmission processing which the input device 11 executes. In the present embodiment, as in the case shown in the display example in FIGS. 16A and 16, in the case of changing the object that is in a selection state, the operation to change an object and the operation to change the mode are distinguished.

In steps S401 through S404, the processing similar to steps S201 through S204 in FIG. 17 are performed.

That is to say, the obtaining unit 101 in step S401 obtains the operating amount. In the case that the user grasps and operates the input device 11 in a three-dimensional free space, the acceleration sensor 31 and angular velocity sensor 32 detects the operating amount corresponding to the operation thereof. The acceleration (Ay(t), Az(t)) of the Y" axis and Z" axis detected by the acceleration sensor 31 and the angular velocity (ωψ(t), ωφ(t)) around the Y' axis and around the Z' axis detected by the angular velocity sensor 32 are obtained at this time. Alternatively, the acceleration (Ax(t) of the X" axis may be obtained. Also, in the case that the button of the input device 11 is operated here, the operation signal may also be obtained.

In step S402 the computing unit 102 computes the angle of the input device. The pitch angle α as to the Y-axis of the input device 11 can be computed from the above-described Expression (1), based on the acceleration Ay(t) of the Y" axis and the acceleration Az(t) of the Z" axis.

The determining unit 103 in step S403 determines which of the pointing mode and the zoom mode is the current mode. In the case that the zoom mode is set in the later-described step S409, this is stored, so determination can be made from this storing. In the case that the zoom mode is not set, determination is made as pointing mode.

In the case determination is made in step S403 that the current mode is the pointing mode, determining processing by the determining unit 103 is performed in step S404. That is to say, determination is made as to whether the size of angular velocity obtained in step S401 is at or greater than the threshold.

In the case that the size of the angular velocity is smaller than the preset threshold, the setting unit 104 sets an object changeable flag to changeable in step S406. Conversely, in the case that the size of angular velocity is at or greater than the preset threshold, the setting unit 104 in step S405 sets the object changeable flat to not-changeable. That is to say, the flag is set so as to restrict the processing of the mode before changing.

After the processing in steps S405 and S406, in step S407 the computing unit 102 computes the movement amount of the pointer. That is to say the movement amount of the pointer is computed based on the operation amount obtained in step S401. For example, by multiplying the acceleration (Ax(t), Ay(t)) by a predetermined coefficient, the pointer movement amount is computed.

Next, in step S408 the determining unit 103 determines whether the angle of the input device 11 is in the mode transition angle range from pointing mode to zoom mode. For example as shown in FIG. 7, in the case that the angle α as to the Y-axis of the input device 11 is within 10 degrees, i.e. in the case of an upward-facing vertical state, the setting unit 104 sets the zoom mode in step S409. Information to the effect that the current mode at this time is zoom mode is stored. The determining in the above-described step S403 is performed based on this storing.

Subsequently, the processing is returned to step S401, the operation amount based on the user operation is obtained again, and the angle of the input device 11 is computed again in step S402. In this case, the zoom mode is set, so the processing is advanced from step S403 to step S411. The computing unit 102 in step S411 computes the zoom amount, based on the operating amount obtained in step S401. The zoom amount is computed by multiplying the acceleration (Ax(t), Ay(t)) by a predetermined coefficient, for example, similar to the pointer movement amount.

In step S412 the transmitting unit 105 transmits the zoom amount computed in step S411.

Upon receiving the zoom amount, the image display device 12 zooms the image as shown in FIGS. 16A and 16B, based thereupon. The processing is executed as shown in the flowchart in FIG. 13.

In step S408, in the case that the angle of the input device 11 is determined to not be in the mode transition angle range from pointing mode to zoom mode, in step S410 the transmitting unit 105 transmits the pointer movement amount and object changeable flag. Not that the pointer movement amount is computed in step S407, and the object changeable flag is set in steps S405 and S406.

That is to say, as shown in FIG. 7, in the case that the angle α as to the Y-axis of the input device 11 is greater than 10 degrees, the mode change from pointing mode to zoom mode is not specified. Thus, the pointing mode is maintained without change.

Upon receiving the pointer movement amount and object changeable flat, the object that is in a selection state is changed, based thereupon. The processing here is executed as shown in the flowchart in FIG. 13.

As shown above, according to the present embodiment, in the case that the user operations a mode change, this information is set as a flag. Accordingly, based on operations other than the mode change operation of the user, the object 201 that is in a selection state displayed with the frame 202 is prevented from being changed into another object.

Display Control Processing 3

Figure 20:
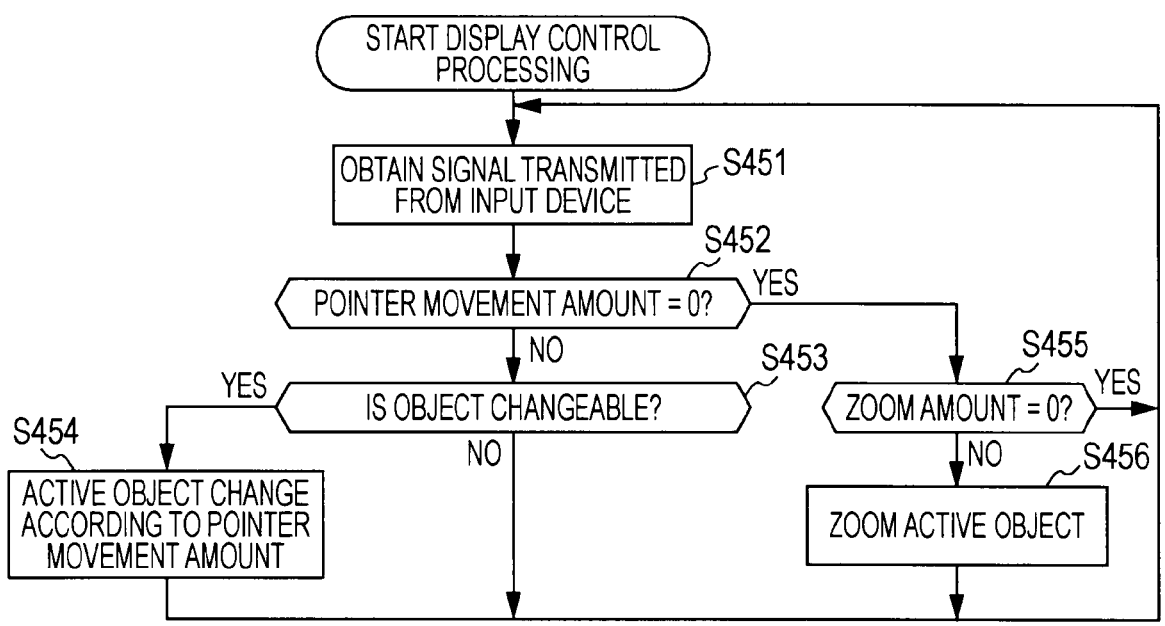
FIG. 20 is a flowchart describing display control processing.

FIG. 20 is a flowchart describing yet another display control processing that the image display device 12 executes. The processing herein is executed corresponding to the command transmission processing in FIG. 19.

The obtaining unit 151 in step S451 obtains the signals transmitted from the input device 11. This signal is transmitted in steps S410 and S412 in FIG. 19 for example, and includes the pointer movement amount, object changeable flag, zoom amount, and so forth.

The determining unit 154 in step S452 determines whether the pointer movement amount obtained in step S451 is 0. In the case that the pointer movement amount is not 0, the mode currently set is determined to be the pointing mode. That is to say, the mode is determined based on the amount of the pointer movement. Also a flag can be issued by the input device 11 to show the mode, and the mode can be determined based thereupon. However, performing the mode determination based on the movement amount enables a smaller packet size that transmits from the input device 11 to the image display device 12, and that much energy of the input device 11 can be reduced.

In the case that the pointer movement amount is not 0, i.e. in the case that the currently set mode is the pointing mode, the determining unit 154 in step S453 determines whether the object is further changeable. This determining can be performed from the object changeable flag obtained in step S451.

In the case that the object changeable flag shows changeable, in step S454 the executing unit 153 changes an object in the selected state according to the pointer movement amount. That is to say, the object that is in the selected state is changed from the object up to that point, to another object at a position corresponding to the pointer movement amount.

In the case determination is made in step S453 that the object is not changeable, the processing to change the object is not executed, the processing is returned to step S451, and the processing thereafter is repeated.

In the case determination is made in step S452 that the pointer movement amount is 0, the determining unit 154 in step S455 determines whether the zoom amount is 0. In the case the zoom amount is not 0, the currently set mode is determined to be a zoom mode. That is to say, mode determining is performed based on the zoom amount.

In the case the zoom amount is not 0, i.e. in the case the currently set mode is the zoom mode, the executing unit 153 in step S456 performs zooming of the object in the selected state based on the zoom amount.

In the case determination is made in step S455 that the zoom amount is 0, processing to perform zooming of the object in the selected state in step S456 is not executed, the processing is returned to step S451, and the processing thereafter is repeated.

6. Sixth Embodiment

Error Display Preventing Control Processing 1

Regardless of if the user operates the input device 11 in order to switch the mode from pointing mode to zoom mode for example, if the pointer moves the operability deteriorates thus, regardless of this being an operation for such mode switching, in order to prevent error displays where the pointer is moved/displayed, the following processing can be performed.

Figure 21:
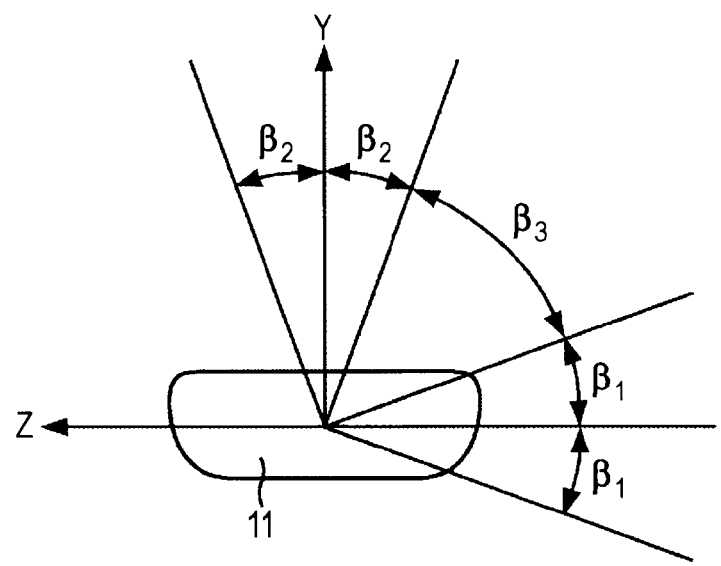
FIG. 21 is a diagram describing an angle of the input device.

FIG. 21 is a diagram to describe the angle of the input device. With the input device 11, let us say that the angle range determined as pointing mode is the angle range of $\pm\beta_1$ from the horizontal plane (in FIG. 21 this is shown with an angle from the opposite direction as the Z-axis). Conversely, the angle range determined as the zoom mode is an angle range of $\pm\beta_2$ from the Y-axis (vertical direction). A region of a dead zone of angle $\beta_3$ is formed between the angle ranges of the pointing mode (first mode) and the zoom mode (second mode). That is to say, in the case of the present embodiment, the operations of the input device 11 when the input device 11 is in the ranges of angle ranges $\beta_1$ through $(\beta_1+\beta_3)$ are ignored. Consequently, for the operations in the case that the input device 11 has an angle greater than angle $\beta_1$ from the horizontal plane and less than angle $(\beta_1+\beta_3)$, i.e. operations for mode switching from the pointing mode to zoom mode, the pointer is suppressed from being moved/displayed.

Error Display Preventing Control Processing 2

Figure 22:
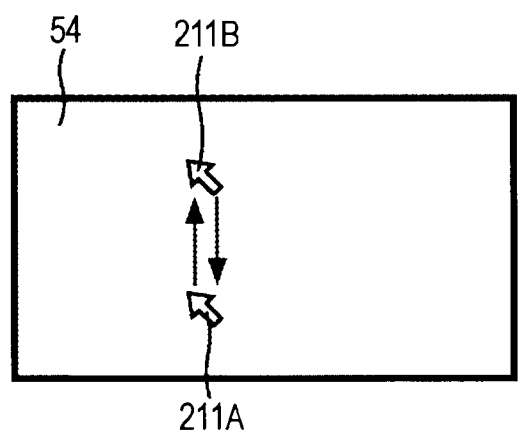
FIG. 22 is a diagram illustrating a display example of a pointer.

FIG. 22 is a diagram showing a display example of the pointer. At the time of the pointing mode, let us say that the pointer 211 is displayed at a position shown as pointer 211A. As a result of the input device 11 having been operated in order to switch the mode from pointing mode to zoom mode, let us say that the pointer 211 is moved/displayed to the position shown as pointer 211B. The movement of pointer 211 is not desired by the user. Thus, in the case of the present embodiment, upon the switching from pointing mode to zoom mode having been detected, the pointer 211 returns to the position shown as pointer 211A from the position shown as pointer 211B. Thus, error displays of the pointer 211 can be actually prevented.

Specifically, the pointer 211 can be returned to the display position at the point-in-time only a predetermined amount of time previous. Alternatively, the pointer 211 can be returned to the display position of the timing wherein the previous operating speed is 0 or a value near 0. In many cases, the operating speed at the time of mode switching becomes 0. Thus, error displays of the pointer 211 can be prevented.

Error Display Preventing Control Processing 3

Figure 23:
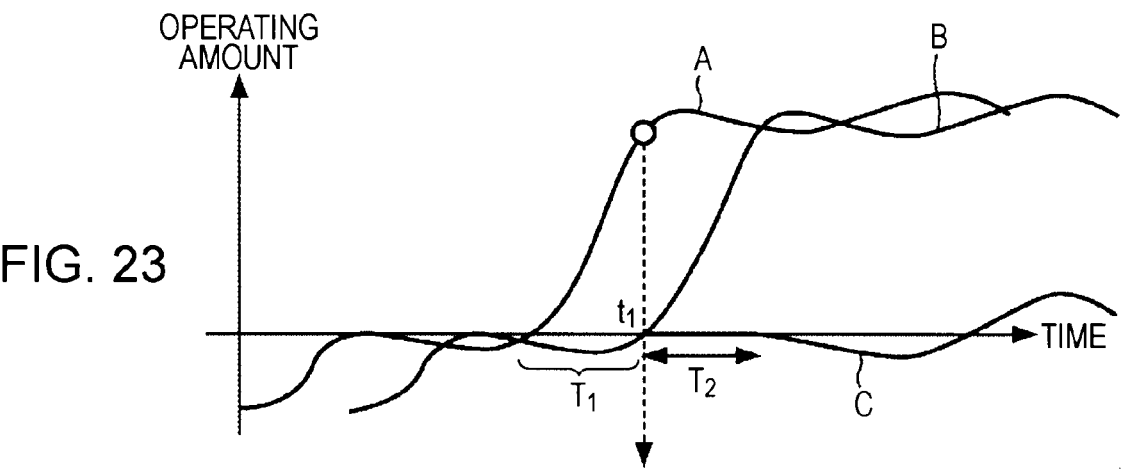
FIG. 23 is a diagram illustrating changes to the operating amount.

FIG. 23 is a diagram to show changes to the operating amount. In the case that the input device 11 is operated to switch modes from the pointing mode to the zoom mode, the operating amount (e.g. movement amount) is shown as a signal A. The operating amount is rapidly increased in a time period $T_1$, and mode switching is detected with a timing of point-in-time $t_1$ at which a predetermined value is achieved. In the case of the present embodiment, the signal A is delayed by only a fixed amount of time, and a signal B is generated. During the time period $T_2$ from the point-in-time $t_1$ wherein the mode switching has been detected, the level of the signal B is changed to 0 (operating amount is 0), whereby a signal C is generated. Computing of the movement amount of the pointer 211 is performed based on the signal C corresponding to the operations of the input device 11.

Thus, according to the present embodiment, the detection of the mode switching is performed based on the original signal A having no delay, and the computing of the movement amount in pointer 211 is performed based on the delayed signal C. Consequently, the pointer 211 is suppressed from being moved/displayed.

Error Display Preventing Control Processing 4

Figure 24:
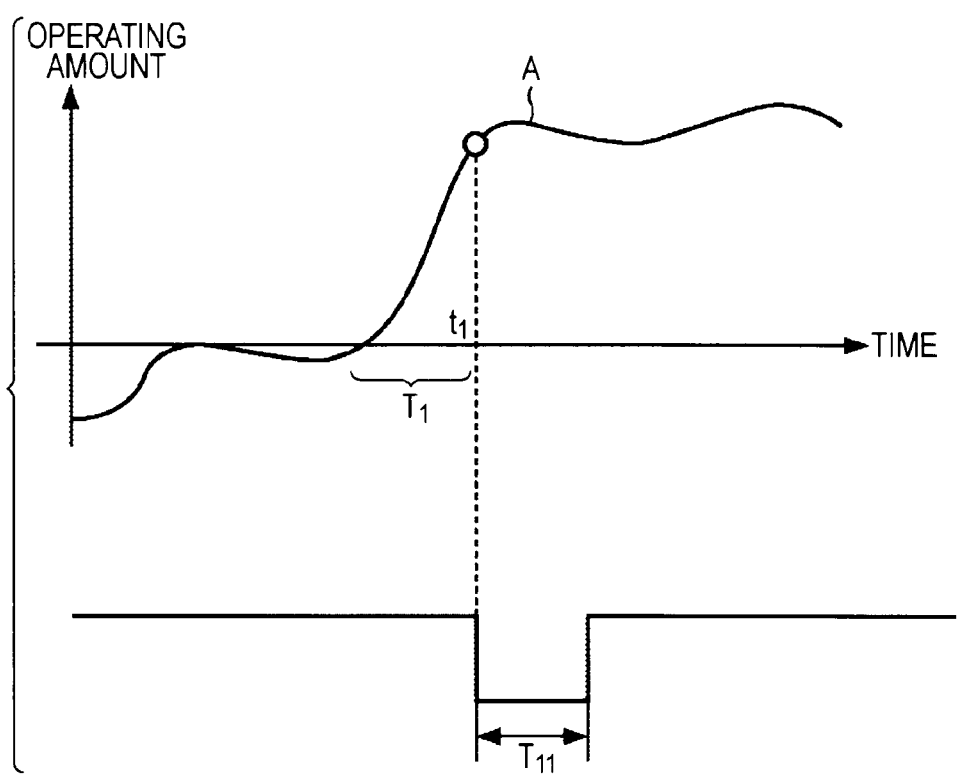
FIG. 24 is a diagram illustrating changes to the operating amount.

FIG. 24 is a diagram showing change to the operating amount. In the case that the input device 11 is operated to switch modes from the pointing mode to zoom mode, the operating amount (e.g. the movement amount) is changes so as to be shown in A in FIG. 24 as signal A. The operating amount is rapidly increased in a time period $T_1$, and mode switching is detected with a timing of point-in-time $t_1$ at which a predetermined value is achieved. The processing up to now is similar to the case in FIG. 23.

In the case of the present embodiment, both the detection of the mode switching and the computing of the movement amount of the pointer 211 are based on the signal A. However as shown in B in FIG. 24, control of the movement/display of the pointer 211 is inhibited during the time period $T_{11}$ from the point-in-time $t_1$ at which mode switching is detected (e.g. 0.1 seconds). Consequently, the movement/display of the pointer 211 during the mode switching is suppressed at the time of mode switching.

Error Display Preventing Control Processing 5

Figure 25:
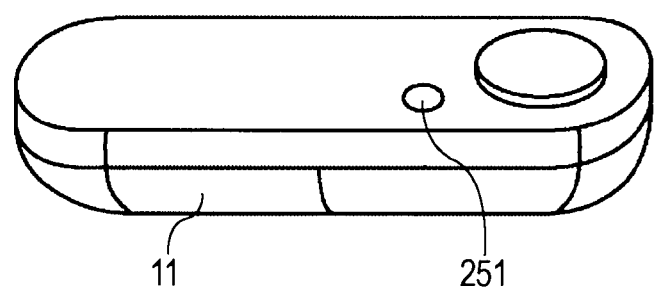
FIG. 25 is a perspective view illustrating a configuration of the input device.

FIG. 25 is a perspective diagram showing the configuration of the input device 11. According to the present embodiment, a button 251 is provided on a predetermined face (in the case of the present embodiment, the upper face) of the input device 11. In the case of moving the pointer 211, the user operates the input device 11 in the state of operating the button 251 with a finger. The state of operating the button 251 may also be locked. In the case that the button 251 is not operated, even if the user has operated the input device 11, the pointer 211 is not moved/displayed. Consequently, at the time of mode switching, by operating the input device 11 without operating the button 251, the pointer 211 can be prevented by being moved/displayed. Note that in the case of not moving the pointer 211, the button 251 may be operated with a finger. Also note that the error display preventing control processing can be executed by combining a single or multiple.

7. Seventh Embodiment

Display Control Processing 4

Figure 26:
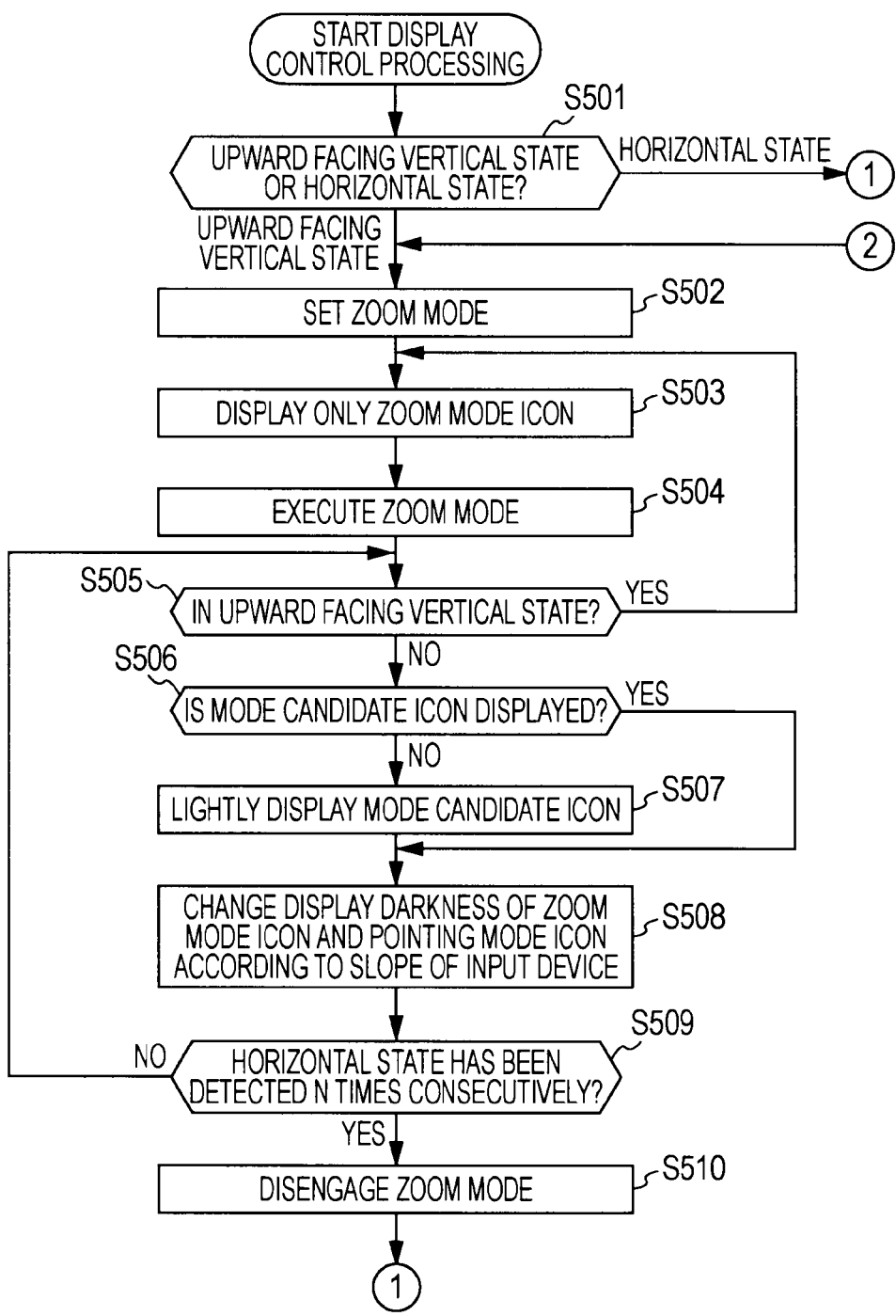
FIG. 26 is a flowchart describing the display control processing.
Figure 27:
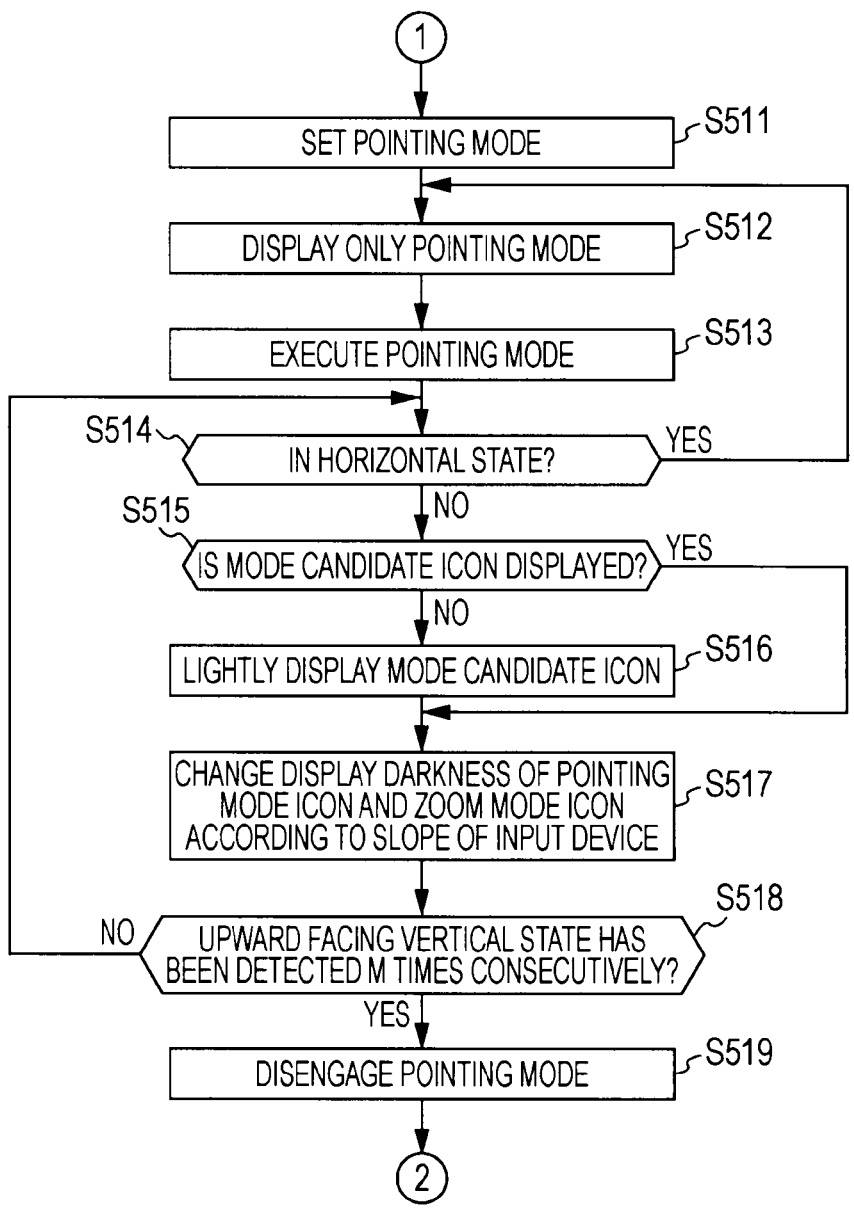
FIG. 27 is a flowchart describing the display control processing.

FIGS. 26 and 27 are flowcharts describing yet another display control processing that the image display device 12 executes. According to the present embodiment, identifying information to identify the currently set mode is displayed. According to the present embodiment, the input device 11 executed processing such as shown in FIG. 5 for example, and transmits commands based on the user operations.

The determining unit 154 determines in step S501 whether the state of the input device 11 is the upward facing vertical state or the horizontal state. The determining herein is processing similar to the case in steps S21, S24, and S30 in FIG. 6 as described above.

In the case that the state of the input device 11 is determined to be in the upward facing vertical state, the setting unit 152 sets the zoom mode in step S502. The mode setting is executed by the user performing a first gesture operation such as shown in FIG. 7. Currently the mode is in zoom mode, so the output unit 155 in step S503 displays only the zoom mode icon.

Figure 28A:
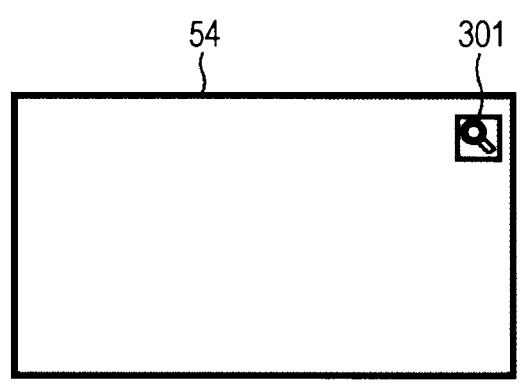
FIGS. 28A and 28B are diagrams illustrating a display example of icons.
Figure 28B:
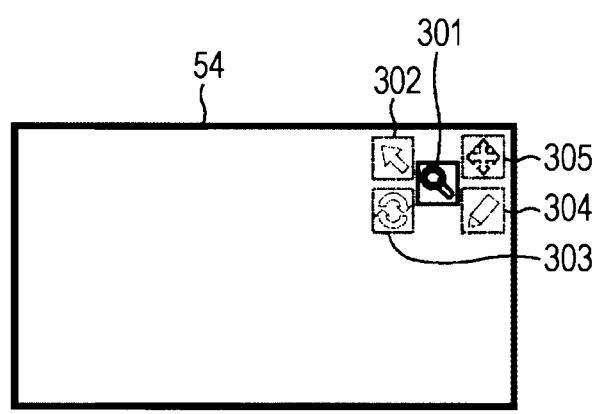

FIGS. 28A and 28B are diagrams showing an icon display example. In step S503, the display screen of the display unit 54 is controlled as shown in FIG. 28A for example. In the diagram, an icon 301, which shows zoom mode as identifying information to identify the set mode, is displayed in the upper right-hand corner of the screen on the display unit 54.

If the currently set mode is not known, the user does not know what sort of operation to perform, which is inconvenient. Thus, by displaying an icon as to the mode set at that time, the user can easily and accurately know the currently set mode, and the desired mode can be quickly set.

In step S504, the executing unit 153 executes the zoom mode. That is to say, based on the operating amount of the second gesture as shown in FIG. 9, the display image on the display unit 54 is zoomed so as to be shown with the reference numerals 54N and 54F in FIG. 9

In step S505, the determining unit 154 determines whether the state of the input device 11 is an upward facing vertical state. That is to say, in the state that the zoom mode is set, determination can be made as to whether or not the state of the input device 11 is unchanged as the upward facing vertical state.

Figure 29A:
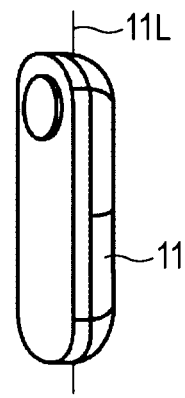
FIGS. 29A through 29E are diagrams illustrating changes to the state of the input device.

FIGS. 29A through 29E are diagrams showing changes to the state of the input device. For example as shown in FIG. 29A, in the case that the input device 11 is in the upward facing vertical state, the processing is returned to step S503. That is to say, in the case that the input device 11 is in the upward facing vertical state, the processing in steps S503 through S505 is repeated.

In zoom mode, the input device 11 is basically used in the upward facing vertical state, but if the angle α as to the Y-axis of the input device 11 is greater than 10 degrees, the input device 11 is determined to not be in the upward facing vertical state in step S505. That is to say, determination is made that the third gesture has been operated for transitioning from zoom mode to pointing mode.

In the case determination is made that the input device 11 is not in the upward facing vertical state, the determining unit 154 determines whether or not a mode candidate icon is displayed. In the case the mode candidate icon is not displayed, in step S507 the output unit 155 lightly displays the mode candidate icon.

Figure 29B:
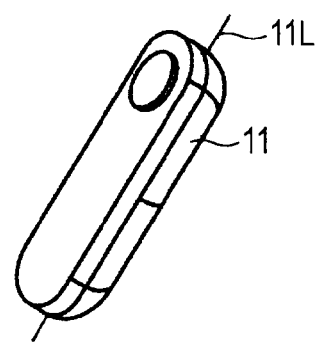

For example, if the input device 11 is tilted from the upward facing vertical state shown in FIG. 29A until the angle as to the Y-axis becomes greater than 10 degrees, as shown in FIG. 29B, the input device 11 is determined to not be in the upward facing vertical state.

At this time, as shown in FIG. 28B for example, the mode candidate icons 302 through 305 are displayed more lightly than the zoom mode icon 302, as identifying information to identify the mode, in the periphery of the icon of zoom mode which is the current mode. That is to say, the candidate icons 302 through 305 of a mode that can be transitioned from the current mode are displayed so as to be identifiable from the current mode in a mode transition process. The icon 302 denotes a pointing mode, the icon 303 denotes a rotating mode, the icon 304 denotes a handwriting input mode, and the icon 305 denotes a scrolling mode.

In the case determination is made in step S506 that the mode candidate icon is displayed, further display does not have to be performed, so the processing in step S507 is skipped.

After the processing in step S507, and in step S506, in the case determination is made that the mode candidate icons are already displayed, the output unit 155 in step S508 changes the darkness of the display for the zoom mode icon and pointing mode icon according to the tilt of the input device.

Figure 29C:
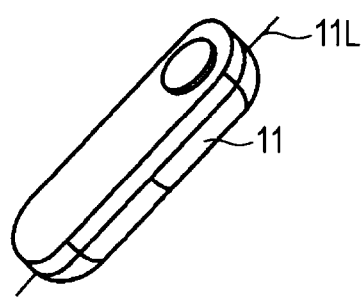
Figure 29D:
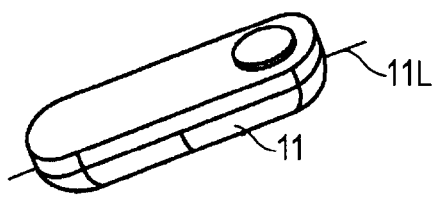

That is to say, in the case that the user changes the mode from zoom mode to pointing mode, for example as shown in FIGS. 29B through 29D, the state of the input device 11 is changed gradually to a state nearing horizontal. Along with this operation, the darkness display of the zoom mode icon and pointing mode icon is changed.

Figure 30A:
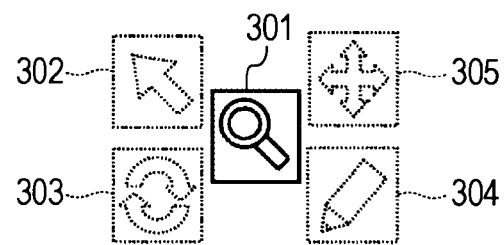
FIGS. 30A through 30D are diagrams illustrating a change example of icon displays.
Figure 30B:
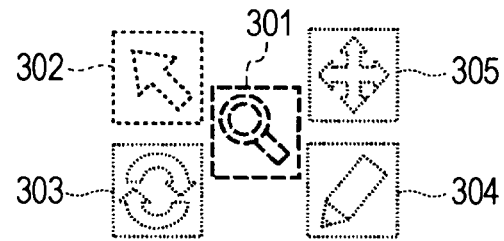
Figure 30C:
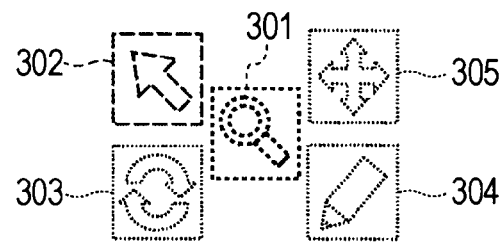

FIGS. 30A through 30D are diagrams showing a change example of the icon display in the case of changing modes. As shown in FIGS. 29B through 29D, upon the state of the input device 11 having been changed gradually to a state nearing horizontal, as shown in FIG. 30A the icon 301 for zoom mode that has been darkly displayed is somewhat lightly displayed as shown in FIG. 30B. The icon 302 of the pointing mode is then somewhat darkly displayed. Upon the state of the input device 11 having been changed to a state nearing horizontal, as shown in FIG. 30B the zoom mode icon 301 which has been somewhat lightly displayed is even more lightly displayed, as shown in FIG. 30C. Conversely, the pointing mode icon 302 that is somewhat darkly displayed as shown in FIG. 30B is even more darkly displayed.

Thus, from the color gradually becoming darker, we can know which operation performed at the time is changing to which mode. When the displayed candidate mode icon is not what the user desires, the user can stop the operation. Accordingly, the user can set the desired mode quickly and accurately.

Following processing in step S508, the determining unit 154 in step S509 determines whether the horizontal state has been detected N times consecutively. N is a base number of times that is 2 or greater, serving as a preset threshold. Even if a horizontal state is detected, in the case that the detection number of times has not reached N times, the processing is returned to step S505, and the processing thereafter is repeated. That is to say, the processing in zoom mode is maintained.

If the zoom mode is immediately disengaged in the case that the horizontal state is detected even once, the zoom mode becomes disengaged in the case that the user erroneously places the input device 11 in the horizontal state, so operability deteriorates. Thus, only in the case of being detected N times consecutively is the zoom mode disengaged. That is to say, similar to the case in step S31 in FIG. 6, the time that the detected state is maintained is measured.

In the case determination is made in step K509 that the horizontal state has been detected N times consecutively, i.e. in the case the horizontal state is maintained a predetermined amount of time, the setting unit 152 disengages the zoom mode in step S510. In step S511 the setting unit 152 sets the pointing mode. Even in the case that the input device 11 is determined in step S501 to be in a horizontal state, the pointing mode setting processing in step S511 is executed.

The pointing mode is set, so the output unit 155 in step S512 displays only the icon for the pointing mode. That is to say, for example in the case the input device 11 is already changed from the upward facing vertical state shown in FIG. 29A to the horizontal state shown in FIG. 29E, only the pointing mode icon 302 is displayed, as shown in FIG. 30D. The zoom mode icon 301, rotating mode icon 303, handwriting input mode icon 304, and scrolling mode icon 305, which are other than the pointing mode icon 302, are all deleted. Accordingly, the user knows the mode that has been finally set.

The executing unit 153 executes a pointing mode in step S513. That is to say, based on the operating amount of the input device 11 that is transmitted from the input device 11, processing is performed to point to the display image on the display unit 54.

Next, in step S514 the determining unit 154 determines whether the input device 11 is in a horizontal state. That is to say, determination is made as to whether the state of the input device 11 remains in the state that the pointing mode has been set.

Figure 29E:
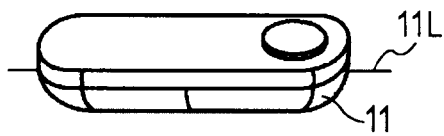
Figure 30D:
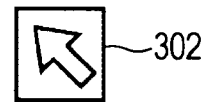

For example, as shown in FIG. 29E, in the case that the input device 11 is in the horizontal state, the processing is returned to step S512. That is to say, in pointing mode, the processing in steps S512 through S514 is repeated.

Figure 31:
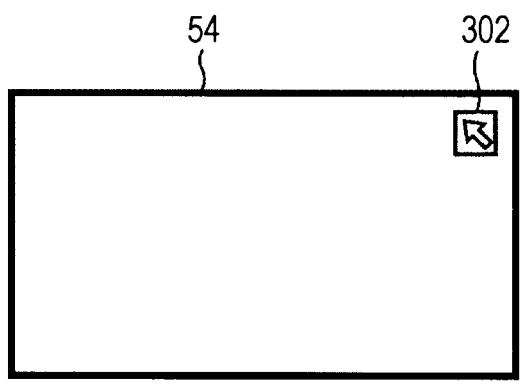
FIG. 31 is a diagram illustrating an icon display example.

FIG. 31 is a diagram showing a display example of an icon. FIG. 31 shows a state of the icon 302 displayed on the display unit 54 in the case that pointing mode has finally been set from zoom mode.

The currently set mode and the transition process mode can be identified by changing color, not only by darkness. Thus, by displaying the icon of the set mode, the user does not have to remember the states corresponding to each mode, or verify the states of each mode with the product manual, so operability improves. Also, before the mode is completely switched over, displaying the transition process mode enables the user to confirm the transitioning mode, whereby the desired mode can be quickly and accurately set.

With the pointing mode, the input device 11 is basically used in the horizontal state, but when the angle α as to the Y-axis of the input device 11 is smaller than 80 degrees (the angle γ as to the Z-axis is greater than 10 degrees), determination is made in step S514 that the input device 11 is not in the horizontal state. That is to say, determination is made that the first gesture has been made to transition from pointing mode to zoom mode.

In the case determination is made that the input device 11 is not in the horizontal state, the determining unit 154 determines in step S515 whether the mode candidate icon is displayed. In the case the mode candidate icon is not displayed, the output unit 155 in step S516 lightly displays the mode candidate icon.

In the case determination is made in step S515 that the mode candidate icon is displayed, further display does not have to be made, so the processing in step S516 is skipped.

Following the processing in step S516, in the case determination is made in step S515 that the mode candidate icon is already displayed, in step S517 the output unit 155 changes the darkness of the pointing mode icon and zoom mode icon according to the tilt of the input device.

That is to say, in the case that the user changes the mode from pointing mode to zoom mode, for example as shown in FIGS. 7 and 29E through 29A, the first gesture operation is performed to gradually change the state of the input device 11 to a state nearing the upward facing vertical state. Along with this operation, the darkness display of the pointing mode icon and zoom mode icon is changed, although this is not shown in the diagram. That is to say, the icon of the pointing mode which is the transition origin mode is gradually lightly displayed, and conversely the icon of the zoom mode which is the transition destination mode is gradually darkly displayed.

As the color gradually becomes darker, the user can see to which mode the currently performed operation is changing. When the icon of the displayed candidate mode is not the mode desired by the user, the user can stop the operation. Accordingly, the user can set the desired mode quickly and accurately.

After the processing in step S517, the determining unit 154 determines in step S518 whether the upward facing vertical state has been detected M times consecutively. M is a base number of times that is 2 or greater, serving as a preset threshold. Even if the upward facing vertical state is detected, in the case that the detection number of times has not reached M times, the processing is returned to step S514, and the processing thereafter is repeated. That is to say, the processing in pointing mode is maintained.

If the pointing mode is immediately disengaged in the case that the upward facing vertical state is detected even once, the pointing mode becomes disengaged in the case that the user erroneously places the input device 11 in the upward facing vertical state, so operability deteriorates. Thus, only in the case of being detected M times consecutively is the pointing mode disengaged. That is to say, similar to the case in step S25 in FIG. 6, the time that the detected state is maintained is measured.

In the case determination is made in step S518 that the upward facing vertical state has been detected M times consecutively, i.e. in the case the upward facing vertical state is maintained a predetermined amount of time, the setting unit 152 disengages the pointing mode in step S519. The processing is then returned to step S502, and in step S502 the setting unit 152 sets the zoom mode. Hereafter, similar processing to that described above is repeated.

Note that the processing in FIGS. 26 and 27 is ended when, similar to the processing in FIG. 6, the same routine within adjacent steps have been repeated a preset number of times, or when a predetermined amount of time that is preset within the same step has passed. Further, when during the operation the user releases a pressed button, operates an identified stopping button, removes a finger from a photo-type touch sensor, or the like, the processing in FIGS. 26 and 27 is ended.

Icon Output Example 1

FIGS. 32 through 38 show another change example of icon display in the case of a mode change.

Figure 32A:
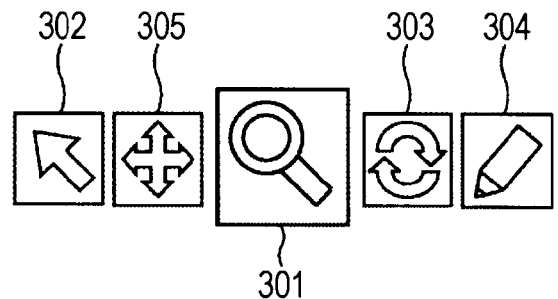
FIGS. 32A through 32C are diagrams illustrating a change example of icon displays.
Figure 32B:
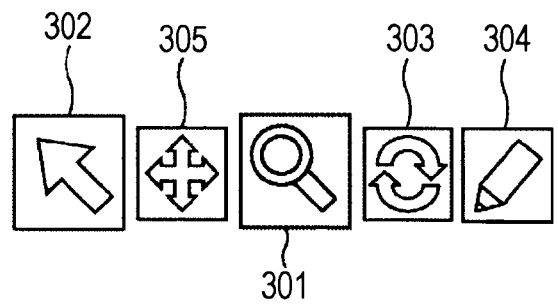
Figure 32C:
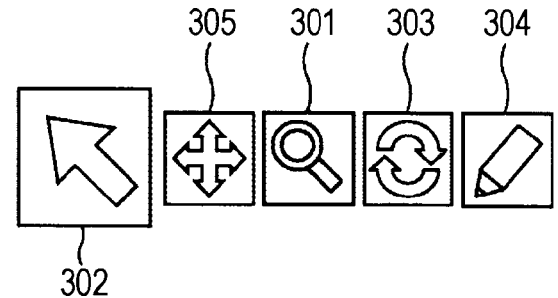

According to the embodiment in FIGS. 32A through 32C, the icons 302, 305, 301, 303, and 304 are displayed in one row horizontally, in sequence from left to right. The current mode is zoom mode, so as shown in FIG. 32A, the icon 301 for zoom mode is displayed larger compared to the other icons 302 through 305 which are all the same size.

Along with the user operation for the mode change from zoom mode to pointing mode, as shown in FIG. 32B the icon 301 of the zoom mode is somewhat smaller, and conversely the icon 302 of the pointing mode is somewhat larger. Upon the pointing mode having been set as shown in FIG. 32C, the icon 301 in zoom mode becomes the same size as the other icons 305, 303, and 304, and the icon 302 of the pointing mode is displayed larger than these.

Figure 33A:
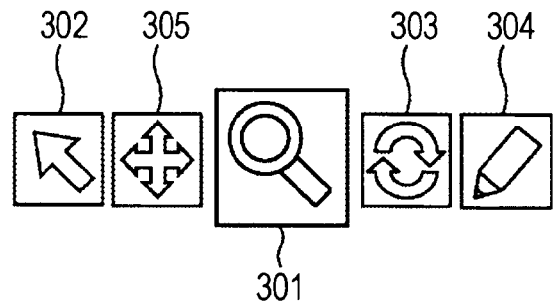
FIGS. 33A through 33C are diagrams illustrating a change example of icon displays.
Figure 33B:
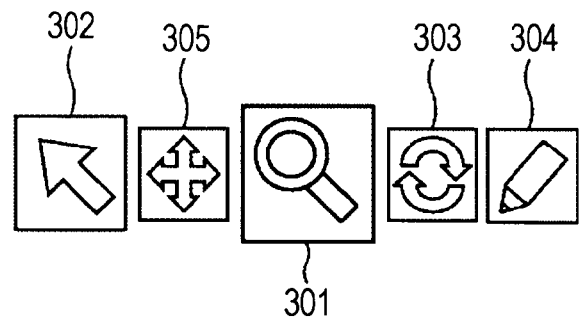
Figure 33C:
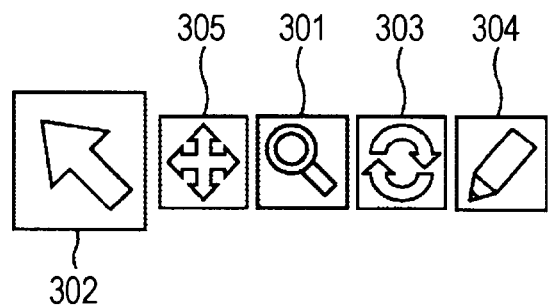

According to the embodiment in FIGS. 33A through 33C, as shown in FIG. 33A, the icon 301 of the current mode is displayed as the largest, similar to the case in FIG. 32A. Along with the operation of mode change from zoom mode to pointing mode, the icon 302 of the pointing mode becomes gradually larger, as shown in FIG. 33B, but icon 301 of the zoom mode remains the largest size. In the case that the pointing mode finally set, as shown in FIG. 33C the icon 302 of the pointing mode becomes the largest, while the icon 301 of the zoom mode is changes to a small size which is the same as the other icons.

Figure 34A:
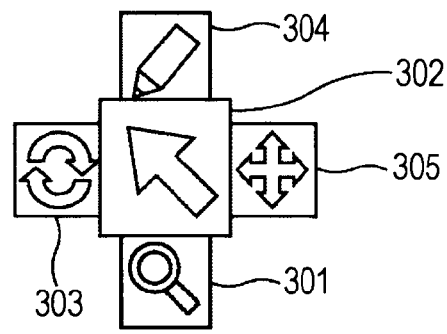
FIGS. 34A through 34C are diagrams illustrating a change example of icon displays.
Figure 34B:
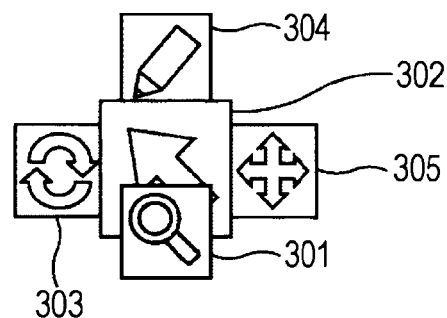
Figure 34C:
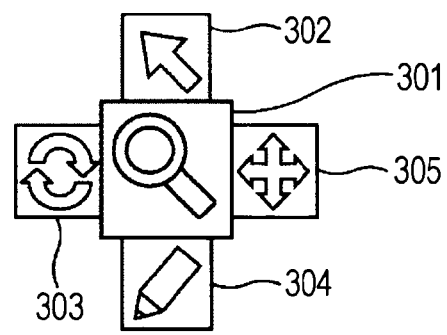

According to the embodiment in FIGS. 34A through 34C, the icons 301 through 305 are disposed in a cross shape. As shown in FIG. 34A, the center icon is the icon of the current mode, and is displayed larger than the other icons displayed to the top, bottom, left, and right thereof. In FIG. 34A, the pointing mode icon 302 is disposed in the center.

In the case that a mode change is performed from pointing mode to zoom mode, the icon 301 of the zoom mode which is the mode candidate for change is gradually moved into the center, as shown in FIG. 34B. Once the zoom mode is set, icon 301 of the zoom mode is positioned at the center, and is displayed largest. The icon 302 of the pointing mode which has been set up to that time is moved to the upper side and displayed smaller, in this example.

Figure 35A:
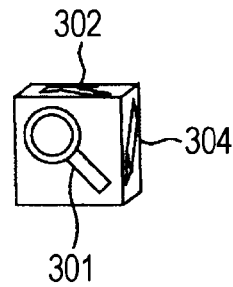
FIGS. 35A through 35C are diagrams illustrating a change example of icon displays.
Figure 35B:
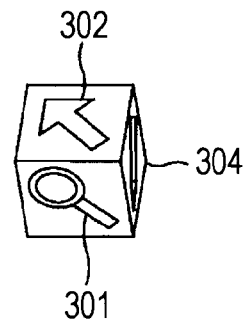
Figure 35C:
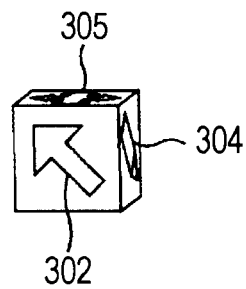

According to the embodiment in FIGS. 35A through 35C, the icons for each mode are displayed on each side of a cube diagram. In this example, three sides of the cube diagram are shown. As shown in FIG. 35A, the icon of the currently set mode is displayed so as to face the front side. In the case of this example, the icon 301 of the zoom mode is displayed facing the front side, the icon 304 of the handwriting input mode is displayed on the right side face, and the icon 302 of the pointing mode is displayed on the upper face.

For example in the case that a mode change is instructed from zoom mode to pointing mode, the upper face of the cube rotates so as to face the front, as shown in FIG. 35B. Consequently, the cube rotates so that the face of the zoom mode icon 301 is hidden and the display area of the zoom mode icon 301 becomes gradually smaller. The cube rotates so that the icon 302 of the pointing mode is positioned on the front face, and the display area of the pointing mode icon 302 becomes gradually larger. When the pointing mode is finally set, as shown in FIG. 35C, the icon 302 of the pointing mode is displayed the largest on the front face. A newly displayed upper face displays the icon 305 of the scrolling mode, which had been positioned on the virtual back face.

Figure 36:
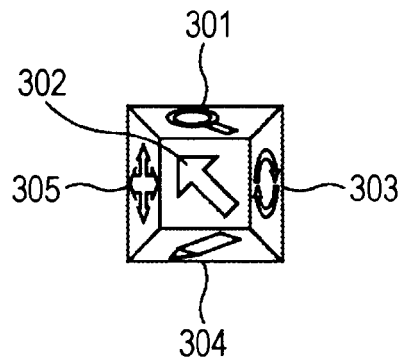
FIG. 36 is a diagram illustrating a change example of icon displays.

According to the embodiment shown in FIG. 36, the icons for each mode are displayed on the faces of a quadrangle frustum diagram. In this example, the icons 301 through 305 for each of the modes are displayed on the 5 faces of the quadrangle frustum except for the bottom face. The quadrangle frustum is disposed so that the upper face thereof faces the front. The set mode is displayed on the upper face. In the example in FIG. 36, the icon of the pointing mode is displayed on the front face, and the other icons 301, 303, 304, 305 are each displayed on a side face.

Figure 37A:
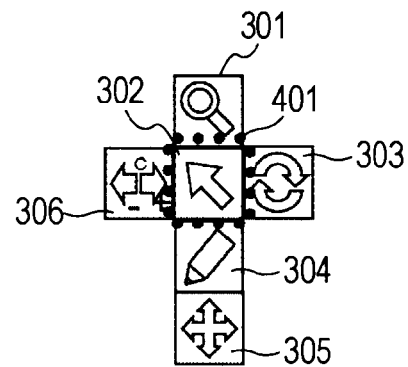
FIGS. 37A through 37C are diagrams illustrating a change example of icon displays.
Figure 37B:
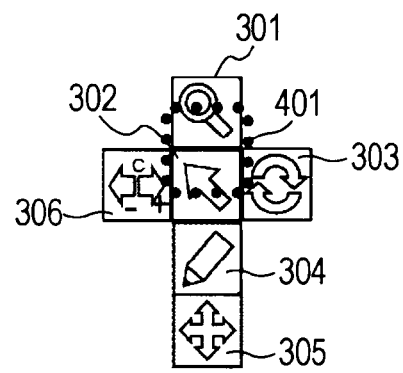
Figure 37C:
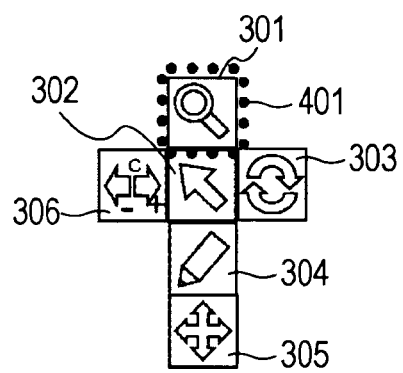

According to the embodiment shown in FIGS. 37A through 37C, the six faces making up a cube are laid out flat in a cross shape, and the icons 301 through 306 for each mode are displayed on the faces thereof. The icon 306 is an icon for a volume adjusting mode. In this display example, a frame 401 is also displayed. The frame 401 is moved/displayed in the periphery of the icon of the currently set mode.

In FIG. 37A, the frame 401 is displayed so as to surround the icon 302 of the pointing mode. In this state, upon a mode change from pointing mode to zoom mode being instructed, the frame 401 moves in the direction of the zoom mode icon 301, as shown in FIG. 37B. Upon the zoom mode being set, the frame is displayed in the periphery of the zoom mode icon 301, as shown in FIG. 37C. The user can identify the currently set mode from the frame 401.

Figure 38A:
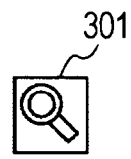
FIGS. 38A through 38D are diagrams illustrating a change example of icon displays.
Figure 38B:
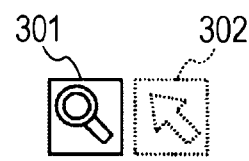

According to the embodiment shown in FIGS. 38A through 38D, the icon of the currently set mode is displayed alone, as shown in FIG. 38A. In this example, the icon 301 of the zoom mode is displayed. Upon the mode change to pointing mode having been instructed in this state, the pointing mode icon 302 is displayed lightly to the right side of the zoom mode icon 301, as shown in FIG. 38B.

Figure 38C:
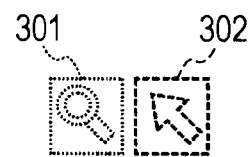
Figure 38D:
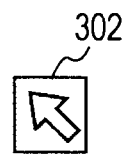

Further, as the instructions of the mode change advance, the zoom mode icon 301 becomes lighter, the pointing mode icon 302 becomes darker, as shown in FIG. 38C. Upon the pointing mode having been set, the zoom mode icon 301 is deleted and only the pointing mode icon 302 is darkly displayed. Thus, the user can see the currently set mode and the change destination mode, whereby the desired mode can be set quickly and accurately.

Icon Output Example 2

Figure 39:
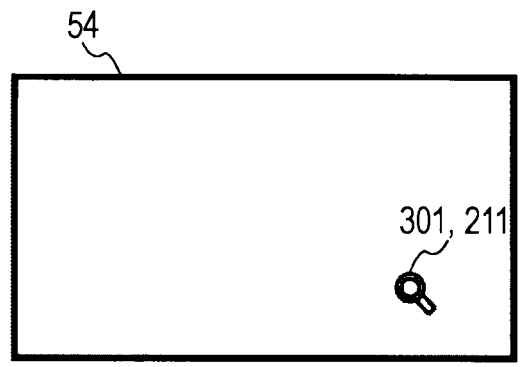
FIG. 39 is a diagram illustrating a display example of identifying information.
Figure 40:
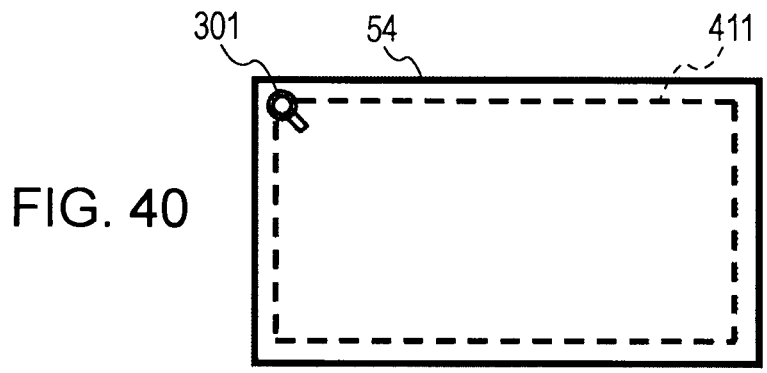
FIG. 40 is a diagram illustrating a display example of identifying information.
Figure 41:
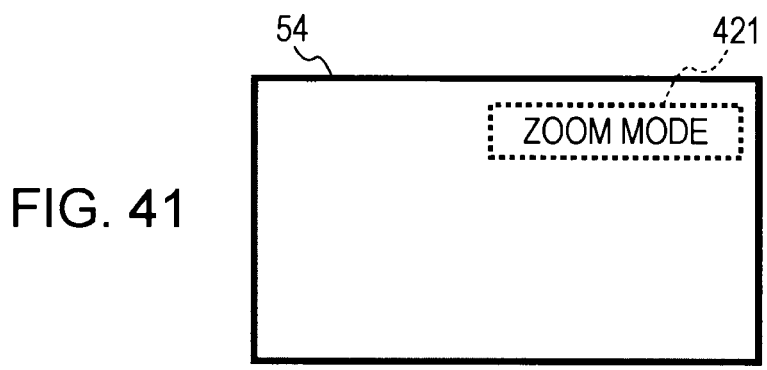
FIG. 41 is a diagram illustrating a display example of identifying information.

FIGS. 39 through 41 are diagrams showing display examples of other identifying information such as icons. According to the embodiment shown in FIG. 39, the pointer 211 is changed to the icon of the mode that has been set. With this example, zoom mode is set, so the pointer 211 is displayed as the zoom mode icon 301.

According to the embodiment shown in FIG. 40, the frame of the mode that has been set is displayed. The icon of the set mode is appended to this frame. In this display example, zoom mode has been set, so the zoom mode frame 411 is displayed. The zoom mode icon 301 is appended to the frame 411, on the upper-left of the frame 411.

According to the embodiment shown in FIG. 41, text 421 expressing the mode that has been set is displayed on the upper right of the screen.

Thus, according to the embodiments shown in FIGS. 39 through 41, the user can know the set mode with certainty.

Icon Output Example 3

According to the embodiments described above, the identifying information of the mode that has been set has been output to the image display device 12 side, but this can be output to the input device 11 side as well. In this case, the above-described display control processing is executed in the input device 11.

Figure 42:
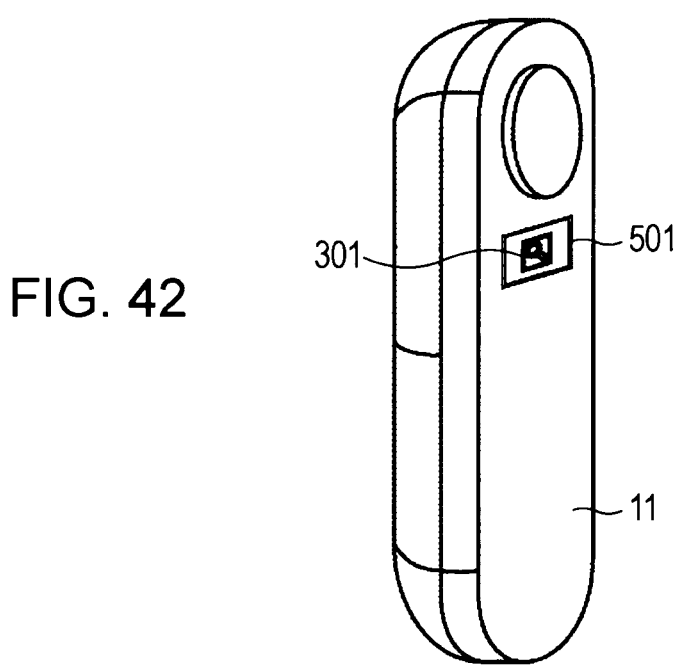
FIG. 42 is a diagram illustrating a display example of identifying information.
Figure 43:
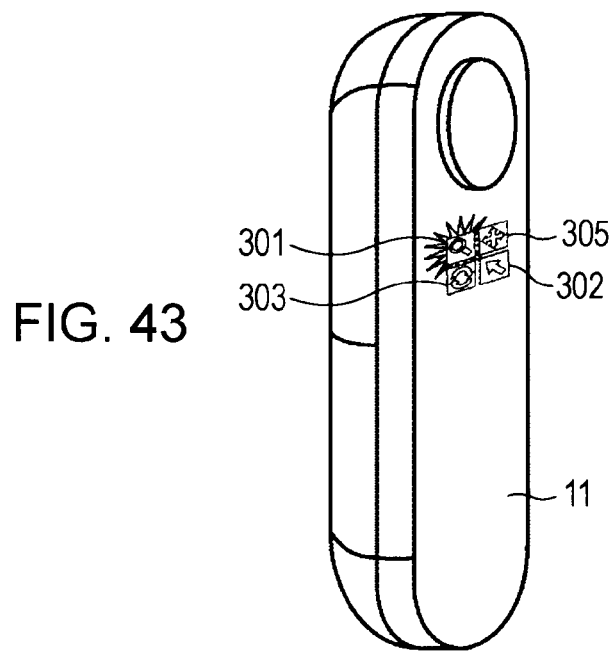
FIG. 43 is a diagram illustrating a display example of identifying information.
Figure 44:
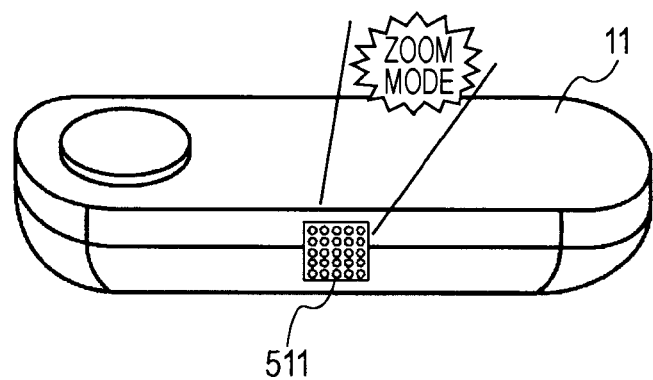
FIG. 44 is a diagram illustrating an output example of identifying information.

FIGS. 42 through 44 are diagrams showing output examples of identifying information in the case of outputting the identifying information on the input device 11 side. According to the embodiment shown in FIG. 42, a display unit 501 is formed on the input device 11, and the icon of the set mode is displayed thereupon. With this example, the zoom mode icon 301 is displayed.

According to the embodiment shown in FIG. 43, multiple icons that can be set are displayed on the input device 11, and of these the icon of the mode that is actually set is displayed in a blinking manner. In this example, the icons 301, 302, 303, and 305 are displayed, and of these the zoom mode icon 301 is blinking.

According to the embodiment shown in FIG. 44, a sound discharge unit 511 is formed on the input device 11. Upon a new mode having been set, the name of the set mode is notified to the user by audio. In this example, the audio of zoom mode is output.

Note that audio of identifying information can also be output on the image display device 12 side.

Icon Output Example 4

According to the embodiments described above, the user is caused to directly recognize the set mode, but indirect recognition can also be made.

Figure 45:
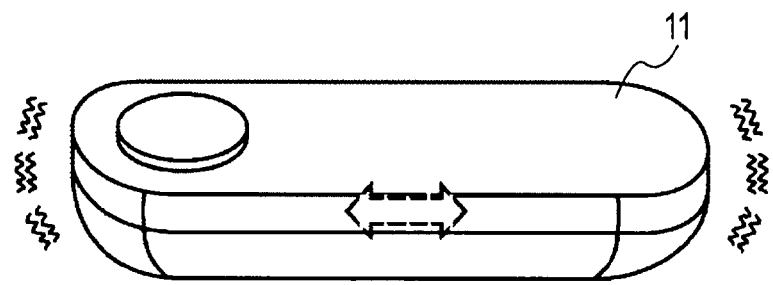
FIG. 45 is a diagram illustrating an output example of identifying information.
Figure 46:
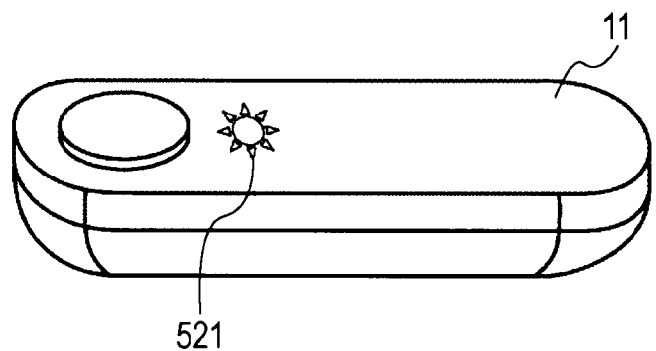
FIG. 46 is a diagram illustrating a display example of identifying information.

FIGS. 45 and 46 are diagrams showing other output examples of identifying information. According to the embodiment shown in FIG. 45, a vibrating member is contained within the input device 11, and the input device 11 vibrates. The vibration matter changes according to the mode. The user can identify the set mode from the vibration pattern thereof. The vibration occurs when the user operates a mode confirmation button or performs a predetermined mode gesture. Alternatively, the vibrating may be caused to occur when the mode is set.

Note that vibrating may be caused to occur for the identifying information on the image display device 12 side. In this case, a vibrating member which causes all or a portion to vibrate is provided in the image display device 12 so that the user can sense the vibration thereof.

According to the embodiment shown in FIG. 46, in the case that a predetermined mode is set, a lighting unit 521 of the input device 11 blinks. The blinking patter changes according to the mode. The user can identify the set mode by the blinking pattern. The blinking occurs when the user operates a mode confirmation button or performs a predetermined mode gesture. Alternatively, the blinking may be caused to occur when the mode is set.

Note that blinking may be caused to occur for the identifying information on the image display device 12 side.

Modified Example

Note that the above described modes are examples, and the present invention can be applied to cases of setting modes other than those described above. Also, output other than the above-described displays, audio, lights, and vibration can also be made.

With the above description, the image display device 12 that is remotely operated by the input device 11 is described as a television receiver, but a personal computer or other information processing device may be used.

Further, in the case that the information processing device to be controlled is a portable information processing device such as a cellular phone or PDA (Personal Digital Assistant), the input device 11 can be configured separated from the portable information processing device or can be configured so as to be integrated therewith. In the case of being integrated, input is performed by operating the entire portable information processing device in a predetermined direction.

The above-described series of processing can be executed with hardware or can be executed with software. In the case of executing the series of processing with software, a program making up the software is installed from a program recording medium into a computer built in to dedicated hardware or a general-use personal computer that can execute various types of functions by installing various types of programs.

Note that according to the present Specification, the steps describing the program include processing performed in a time-series manner in the described sequence, as well as processing that is not necessarily in time-series manner but in parallel or individually.

Also, according to the present Specification, the term "system" means an entirety of equipment, made up of multiple devices.

Note that the embodiments of the present invention are not limited to the above-described embodiments, and that various types of modifications can be made within the scope and intent of the present invention.

The present application contains subject matter related to that disclosed in Japanese Priority Patent Application JP 2009-081569 filed in the Japan Patent Office on Mar. 30, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An input device comprising:
an operating unit that a user grasps and operates in a three-dimensional free space to remotely operate an information processing device; and
a transmitting unit to transmit a plurality of signals to the information processing device, the plurality of signals including:
a signal for a first gesture in said free space of said operating unit to set a first mode upon determination that the first gesture exceeds a first predetermined threshold and moves the input device to a first position in said three-dimensional free space,
a signal for a second gesture in said free space of said operating unit which differs from said first gesture to execute processing in said first mode set based on said first gesture, a display of the information processing device changed in accordance with reception of the signal for the second gesture,
a signal for a third gesture in said free space of said operating unit which differs from said first gesture and said second gesture to disengage from the first mode and set a second mode upon determination that said third gesture occurs after said first gesture sets the first mode, exceeds a second predetermined threshold, and moves the input device to a second position different from the first position in said three-dimensional free space, and
a signal for a fourth gesture in said free space of said operating unit which differs from said third gesture to execute processing in said second mode set based on said third gesture, the display of the information processing device changed in accordance with reception of the signal for the fourth gesture.

2. The input device according to claim 1, wherein one of said first gesture and said second gesture is a rotating movement gesture of said operating unit, and the other is a parallel movement gesture.

3. The input device according to claim 2, wherein said first predetermined threshold includes an angle and time of a state of said operating unit.

4. The input device according to claim 3, wherein said first gesture is a gesture to rotate said operating unit from a horizontal state to a state wherein a front end thereof is in an upward facing vertical state;
and wherein said second gesture is a gesture to move said operating unit of which the front end is in an upward facing vertical state to bring the input device nearer to or farther from the user.

5. The input device according to claim 1, wherein said second predetermined threshold includes an angle and time of the state of said operating unit.

6. The input device according to claim 1, further comprising:
a setting unit to set at least the first mode based on the first gesture in said free space of said operating unit.

7. The input device according to claim 1, wherein upon determination that said first mode is changed, the processing of said first mode before being changed is restricted.

8. An input method for an input device including an operating unit, and a transmission unit, said method comprising the steps of:

grasping and operating of said operating unit by a user in a three-dimensional free space to remotely operate an information processing device; and transmitting, by said transmitting unit, a plurality of signals to the information processing device, the plurality of signals including:

a signal for a first gesture in said free space of said operating unit to set a first mode upon determination that the first gesture exceeds a first predetermined threshold and moves the input device to a first position in said three-dimensional free space, a signal for a second gesture in said free space of said operating unit which differs from said first gesture to execute processing in said first mode set based on said first gesture, a display of the information processing device changed in accordance with reception of the signal for the second gesture, a signal for a third gesture in said free space of said operating unit which differs from said first gesture and said second gesture to disengage from the first mode and set a second mode upon determination that said third gesture occurs after said first gesture sets the first mode, exceeds a second predetermined threshold, and moves the input device to a second position different from the first position in said three-dimensional free space, and a signal for a fourth gesture in said free space of said operating unit which differs from said third gesture to execute processing in said second mode set based on said third gesture, the display of the information processing device changed in accordance with reception of the signal for the fourth gesture.

9. A non-transitory computer readable storage medium having instructions stored therein that when executed by a processor in an input device causes the processor to execute a method comprising:

remotely operating an information processing device in accordance with movement of the input device in a three-dimensional free space;

transmitting a plurality of signals to the information processing device, the plurality of signals including:

a signal for a first gesture in said free space to set a first mode upon determination that the first gesture exceeds a first predetermined threshold and moves the input device to a first position in said three-dimensional free space, a signal for a second gesture in said free space which differs from said first gesture to execute processing in said first mode set based on said first gesture, a display of the information processing device changed in accordance with reception of the signal for the second gesture, a signal for a third gesture in said free space which differs from said first gesture and said second gesture to disengage from the first mode and set a second mode upon determination that said third gesture occurs after said first gesture sets the first mode, exceeds a second predetermined threshold, and moves the input device to a second position different from the first position in said three-dimensional free space, and a signal for a fourth gesture in said free space which differs from said third gesture to execute processing in said second mode set based on said third gesture, the display of the information processing device changed in accordance with reception of the signal for the fourth gesture.

10. An information processing system comprising:

an input device; and an information processing device that is controlled by a plurality of remote control signals transmitted from said input device, wherein said input device is grasped and operated by a user in a three-dimensional free space to remotely operate the information processing device, and wherein said plurality of remote control signals include:

a signal for a first gesture in said free space to set a first mode upon determination that the first gesture exceeds a first predetermined threshold and moves the input device to a first position in said three-dimensional free space, a signal for a second gesture in said free space which differs from said first gesture to execute processing in said first mode set based on said first gesture, a display of the information processing device changed in accordance with reception of the signal for the second gesture, a signal for a third gesture in said free space which differs from said first gesture and said second gesture to disengage from the first mode and set a second mode upon determination that said third gesture occurs after said first gesture sets the first mode, exceeds a second predetermined threshold, and moves the input device to a second position different from the first position in said three-dimensional free space, and a signal for a fourth gesture in said free space which differs from said third gesture to execute processing in said second mode set based on said third gesture, the display of the information processing device changed in accordance with reception of the signal for the fourth gesture.

11. An information processing device comprising:

a display device;

a setting unit to set a plurality of modes in accordance with a plurality of signals transmitted from an input device which the users grasps and operates in a three-dimensional free space to remotely the information processing device; and an executing unit to execute processing for said plurality of modes that are set based on said received plurality of signals which include:

a signal for a first gesture in said free space to set a first mode from the plurality of modes upon determination that the first gesture exceeds a first predetermined threshold and moves the input device to a first position in said three-dimensional free space, a signal for a second gesture in said free space which differs from said first gesture to execute processing, by the executing unit, in said first mode set based on said first gesture, the display of the information processing device changed in accordance with reception of the signal for the second gesture, a signal for a third gesture in said free space which differs from said first gesture and said second gesture to disengage from the first mode and set a second mode from the plurality of modes upon determination that said third gesture occurs after said first gesture sets the first mode, exceeds a second predetermined threshold, and moves the input device to a second position different from the first position in said three-dimensional free space, and
a signal for a fourth gesture in said free space which differs from said third gesture to execute processing, by the executing unit, in said second mode set based on said third gesture, the display of the information processing device changed in accordance with reception of the signal for the fourth gesture.

12. The information processing device according to claim 11, wherein operating speed of said plurality of modes is controlled according to a movement speed of said input device at a time of said second gesture.

13. The information processing device according to claim 11, wherein identifying information is output that identifies said first mode that is set.

14. The information processing device according to claim 13, wherein identifying information of said second mode that can be transitioned from said first mode is further output.

15. The information processing device according to claim 13, wherein said identifying information of either said first mode or said second mode is output by display, audio, or vibration.

16. An information processing method for an information processing device including
a display,
a setting unit, and
an executing unit,
said method comprising the steps of:
setting of a plurality of modes by said setting unit in accordance with a plurality of signals transmitted from an input device a users grasps and operates in a three-dimensional free space remotely operate the information processing device; and
executing of processing by the executing unit for said plurality of modes that are set based on said received plurality of signals which include:
a signal for a first gesture in said free space to set a first mode from the plurality of modes upon determination that the first gesture exceeds a first predetermined threshold and moves the input device to a first position in said three-dimensional free space,
a signal for a second gesture in said free space which differs from said first gesture to execute processing, by the executing unit, in said first mode set based on said first gesture, the display of the information processing device changed in accordance with reception of the signal for the second gesture,
a signal for a third gesture in said free space which differs from said first gesture and said second gesture to disengage from the first mode and set a second mode from the plurality of modes upon determination that said third gesture occurs after said first gesture sets the first mode, exceeds a second predetermined threshold, and moves the input device to a second position different from the first position in said three-dimensional free space, and
a signal for a fourth gesture in said free space which differs from said third gesture to execute processing, by the executing unit, in said second mode set based on said third gesture, the display of the information processing device changed in accordance with reception of the signal for the fourth gesture.

17. An information processing device comprising:
setting means to set a plurality of modes in accordance with a plurality of signals transmitted from an input device that a user grasps and operates in a three-dimensional free space to remotely operate the information processing device; and
executing means to execute processing for said plurality of modes that are set based on said received plurality of signals which include:
a signal for a first gesture in said free space to set a first mode from the plurality of modes upon determination that the first gesture exceeds a first predetermined threshold and moves the input device to a first position in said three-dimensional free space,
a signal for a second gesture in said free space which differs from said first gesture to execute processing in said first mode set based on said first gesture, the display of the information processing device changed in accordance with reception of the signal for the second gesture,
a signal for a third gesture in said free space which differs from said first gesture and said second gesture to disengage from the first mode and set a second mode from the plurality of modes upon determination that said third gesture occurs after said first gesture sets the first mode, exceeds a second predetermined threshold, and moves the input device to a second position different from the first position in said three-dimensional free space, and
a signal for a fourth gesture in said free space which differs from said third gesture to execute processing in said second mode set based on said third gesture, the display of the information processing device changed in accordance with reception of the signal for the fourth gesture.

18. An input device comprising:
operating means for remotely operating an information processing device; and
transmitting means for transmitting a plurality of signals to the information processing device, the plurality of signals including:
a signal for a first gesture in a three dimensional free space to set a first mode upon determination that the first gesture exceeds a first predetermined threshold and moves the input device to a first position in said three-dimensional free space,
a signal for a second gesture in said free space which differs from said first gesture to execute processing in said first mode set based on said first gesture, a display of the information processing device changed in accordance with reception of the signal for the second gesture,
a signal for a third gesture in said free space which differs from said first gesture and said second gesture to disengage from the first mode and set a second mode upon determination that said third gesture occurs after said first gesture sets the first mode, exceeds a second predetermined threshold, and moves the input device to a second position different from the first position in said three-dimensional free space, and
a signal for a fourth gesture in said free space which differs from said third gesture to execute processing in said second mode set based on said third gesture, the display of the information processing device changed in accordance with reception of the signal for the fourth gesture.

19. A non-transitory computer readable storage medium having instructions stored therein that when executed by a processor in an information processing device causes the processor to execute a method comprising:

setting a plurality of modes in accordance with a plurality of signals transmitted from an input device that a user grasps and operates in a three-dimensional free space remotely operate the information processing device; and executing processing for said plurality of modes that are set based on said received plurality of signals which include:

a signal for a first gesture in said free space to set a first mode from the plurality of modes upon determination that the first gesture exceeds a first predetermined threshold and moves the input device to a first position in said three-dimensional free space, a signal for a second gesture in said free space which differs from said first gesture to execute processing in said first mode set based on said first gesture, the display of the information processing device changed in accordance with reception of the signal for the second gesture, a signal for a third gesture in said free space which differs from said first gesture and said second gesture to disengage from the first mode and set a second mode from the plurality of modes upon determination that said third gesture occurs after said first gesture sets the first mode, exceeds a second predetermined threshold, and moves the input device to a second position different from the first position in said three-dimensional free space, and a signal for a fourth gesture in said free space which differs from said third gesture to execute processing in said second mode set based on said third gesture, the display of the information processing device changed in accordance with reception of the signal for the fourth gesture.

\* \* \* \* \*